(12) United States Patent
Schulz et al.

(10) Patent No.: US 7,026,418 B2
(45) Date of Patent: Apr. 11, 2006

(54) EMULSION POLYMERIZATION PROCESS UTILIZING ETHYLENICALLY UNSATURATED AMINE SALTS OF SULFONIC, PHOSPHORIC AND CARBOXYLIC ACIDS

(75) Inventors: Alfred K. Schulz, Lake Villa, IL (US); Adnan Siddiqui, Arlington Heights, IL (US)

(73) Assignee: Stepan Company, Northfield, IL (US)

( * ) Notice: Subject to any disclaimer, the term of this patent is extended or adjusted under 35 U.S.C. 154(b) by 0 days.

(21) Appl. No.: 10/900,871

(22) Filed: Jul. 28, 2004

(65) Prior Publication Data

US 2005/0010009 A1 Jan. 13, 2005

Related U.S. Application Data

(63) Continuation of application No. 10/117,834, filed on Apr. 8, 2002, now abandoned, which is a continuation of application No. 09/521,819, filed on Mar. 9, 2000, now Pat. No. 6,407,162, which is a continuation of application No. 08/789,068, filed on Jan. 28, 1997, now Pat. No. 6,239,240.

(51) Int. Cl.
C08F 116/14 (2006.01)
C08F 126/02 (2006.01)
C08F 128/02 (2006.01)

(52) U.S. Cl. ............... 526/286; 287/288; 287/910; 287/911; 287/932

(58) Field of Classification Search ............ 526/286, 526/287, 288, 910, 911, 932
See application file for complete search history.

(56) References Cited

U.S. PATENT DOCUMENTS

| | | | |
|---|---|---|---|
| 3,673,142 A | 6/1972 | Saunders et al. | 260/29.6 |
| 3,759,982 A | 9/1973 | Samour | 260/485 |
| 3,780,092 A | 12/1973 | Samour et al. | 260/482 |
| 3,925,442 A | 12/1975 | Samour et al. | 260/459 |
| 3,936,492 A | 2/1976 | Samour et al. | 260/482 |
| 3,941,857 A | 3/1976 | Wu | 260/837 |
| 3,983,166 A * | 9/1976 | Samour | 560/151 |
| 4,011,259 A | 3/1977 | Samour et al. | 260/485 |
| 4,049,608 A | 9/1977 | Steckler et al. | 260/29.6 |
| 4,060,679 A | 11/1977 | Naarmann et al. | 526/304 |
| 4,075,411 A | 2/1978 | Dickstein | 560/224 |
| 4,176,028 A | 11/1979 | Graham | 204/159.16 |
| 4,188,293 A | 2/1980 | Green et al. | 210/47 |
| 4,224,455 A | 9/1980 | Deutsch | 560/193 |
| 4,329,441 A | 5/1982 | Bergthaller | 526/193 |
| 4,336,361 A * | 6/1982 | Tsuruta et al. | 526/180 |
| 4,377,185 A | 3/1983 | Katz | 138/90 |
| 4,380,601 A | 4/1983 | Welsh et al. | 524/555 |
| 4,552,939 A | 11/1985 | Thaler et al. | 526/287 |
| 4,657,948 A * | 4/1987 | Roark et al. | 523/130 |
| 4,912,157 A | 3/1990 | Clark et al. | 524/265 |
| 5,021,525 A | 6/1991 | Montague et al. | 526/210 |
| 5,039,339 A | 8/1991 | Phan et al. | 428/481 |
| 5,049,383 A | 9/1991 | Huth et al. | 424/405 |
| 5,162,475 A | 11/1992 | Tang et al. | 526/333 |
| 5,250,642 A | 10/1993 | Ahmed et al. | 526/240 |
| 5,296,627 A | 3/1994 | Tang et al. | 558/34 |
| 5,302,192 A | 4/1994 | McLearie et al. | 106/18.33 |
| 5,344,867 A | 9/1994 | Morgan et al. | 524/460 |
| 5,399,617 A | 3/1995 | Farwaha et al. | 524/815 |
| 5,478,883 A | 12/1995 | Anchor et al. | 524/812 |
| 5,536,811 A | 7/1996 | Wood | 528/482 |
| 5,679,732 A | 10/1997 | Van Rheenen | 524/21 |
| 5,717,015 A | 2/1998 | Dust et al. | 524/236 |
| 5,736,247 A | 4/1998 | Takada et al. | 428/424.2 |
| 5,919,742 A | 7/1999 | Tsuzuki et al. | 510/112 |
| 5,928,783 A | 7/1999 | Phan et al. | 428/355 |
| 5,969,032 A | 10/1999 | Phan et al. | 524/460 |
| 6,017,561 A | 1/2000 | Zhou et al. | 424/486 |
| 6,239,240 B1 | 5/2001 | Schultz et al. | 526/277 |
| 6,407,162 B1 | 6/2002 | Schultz et al. | 524/815 |

FOREIGN PATENT DOCUMENTS

| | | |
|---|---|---|
| DE | 2051479 | 5/1971 |
| DE | 19646965 A1 | 6/1998 |
| EP | 0221498 A2 | 5/1987 |
| EP | 0747456 A2 | 12/1996 |
| EP | 0770655 A2 | 6/1997 |
| EP | 0822248 A2 | 2/1998 |
| FR | 1282258 | 6/1962 |
| WO | WO 89/12618 | 12/1989 |
| WO | WO 97/45495 | 12/1997 |
| WO | WO 98/21253 | 3/1998 |

* cited by examiner

*Primary Examiner*—Kelechi C. Egwim
(74) *Attorney, Agent, or Firm*—McAndrews, Held & Malloy, Ltd.

(57) ABSTRACT

Disclosed is an improved method of making polymers. The method utilizes at least one ethylenically unsaturated monomer and at least one polymerizable surface active agent. The polymerizable surface active agent is capable of co-polymerization with traditional monomers and/or polymerization with itself (i.e. homopolymerization) and is preferably substantially completely consumed during the course of the polymerization. Polymers produced by the method of the present invention are well suited for use in coatings, adhesives, sealants, elastomers and the like, as they form stable films, possess excellent adhesion properties and have improved hydrolytic stability characteristics. The present invention also encompasses homopolymeric surface active agents and their use in polymerization reactions.

3 Claims, 2 Drawing Sheets

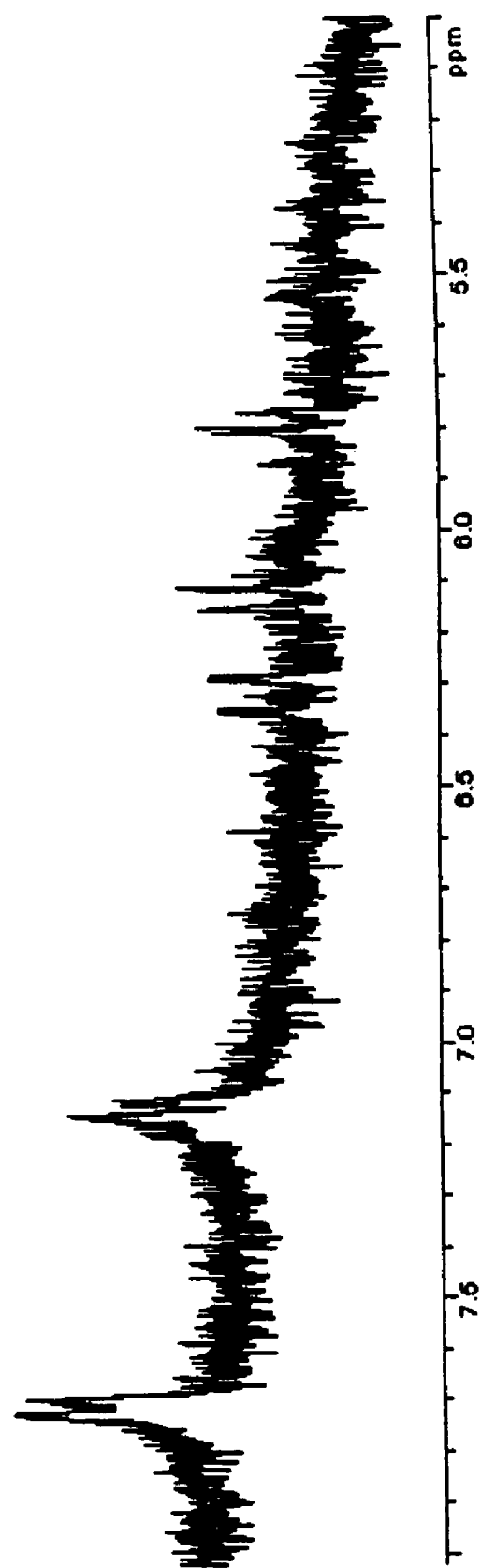
Figure II

EMULSION POLYMERIZATION PROCESS UTILIZING ETHYLENICALLY UNSATURATED AMINE SALTS OF SULFONIC, PHOSPHORIC AND CARBOXYLIC ACIDS

This application is a continuation of 10/117,834, filed Apr. 8, 2002, now abandoned, which is a continuation of Ser. No. 09/521,819, filed Mar. 9, 2000, now U.S. Pat. No. 6,407,162, which is a continuation of Ser. No. 08/789,068, filed Jan. 28, 1997, now U.S. Pat. No. 6,239,240.

BACKGROUND OF THE INVENTION

1. Field of the Invention

The present invention relates to an improved emulsion polymerization process utilizing ethylenically unsaturated amine salts of sulfonic, phosphoric and carboxylic acids. More specifically, the invention relates to emulsion polymerization processes which utilize ethylenically unsaturated amine salts of alkylbenzene sulfonic acids, alkyl olefin sulfonic acids, alkyl alcohol sulfuric acid esters, or alkoxylated alkyl alcohol sulfuric acid esters, fatty acids, and fatty phosphate acid esters, or mixtures thereof, to form polymers, discrete solid polymeric particles and latexes. Additionally, the present invention relates to the use of the salts to impart improved adhesion, hydrophobicity, resistance to film yellowing, scrubability, anti-blooming, hydrolytic stability and shear stability characteristics to polymer emulsions and latex formulations.

2. Description of the Related Art

The emulsion polymerization of ethylenically unsaturated monomers to form discrete solid polymeric particles for use in coating, sealant, adhesive and/or elastomer (CASE) applications is well known to the art. Conventional emulsion polymerization of ethylenically unsaturated monomers employs one or more water soluble surfactants to emulsify the monomers and the resulting polymer products, i.e., latexes. The monomers used in emulsion polymerization reactions are generally water-insoluble, but in some cases may be water-soluble. During a typical emulsion polymerization, a surfactant is used to suspend small portions of monomer in a continuous or semi-continuous aqueous phase. Typically, the monomer molecules are suspended as small spheres in the aqueous phase, wherein the polymerization takes place within the small spheres. The water soluble surface active agents, i.e., surfactants, typically utilized in emulsion polymerization reactions are anionic, nonionic, and cationic surfactants or a mixture thereof.

The polymeric particles formed by the emulsion polymerization process are typically utilized in coating, sealant, adhesive and/or elastomer (CASE) applications. In a traditional emulsion polymerization reaction, the surfactant does not become chemically bonded to the polymeric particles by carbon-carbon bond formation but rather remains in the polymeric particle product solution after the emulsion polymerization reaction is complete, i.e., all of the monomer(s) is reacted. The unreacted surfactant can have a detrimental effect on the polymer product solution, as it can interfere with the performance of such polymerization products in CASE applications; the suspension of polymeric particles may become destabilized over time and undergo unwanted coagulation. The unreacted surfactant may cause unwanted pealing of a latex paint coating on a substrate, and decreased moisture and scrubability resistance in other various CASE applications. Additionally, residual surfactant can cause an undesirable "blooming" that leads to surface irregularities in a resulting CASE material that is applied to a substrate.

Several proposals have been made in the prior art to employ a polymerizable surfactant as the surface active agent during an emulsion polymerization reaction. U.S. Pat. No. 5,478,883 (incorporated herein by reference in its entirety) describes the use of ethylenically unsaturated polymerizable water-soluble nonionic surfactants formed by the reaction of a diallylamine compound with ethylene oxide, propylene oxide or butylene oxide, in emulsion polymerization reactions. Similarly, U.S. Pat. No. 5,162,475 (incorporated herein by reference) provides alpha-beta ethylenically unsaturated poly(alkylenoxy) polymerizable surface active compounds for use in emulsion polymerization. For additional examples of polymerizable surfactants for use in emulsion polymerization processes, see U.S. Pat. Nos. 4,377,185 and 4,049,608.

Non-polymerizable surfactant solutions to the traditional problems encountered in performing an emulsion polymerization process are numerous. U.S. Pat. No. 3,941,857 describes the use of epoxy resins which react with the residual anionic, cationic or nonionic surfactant. Polymerizable compounds such as allyl alcohol (and esters thereof) have been found to be ineffective due to the formation of undesirable high levels of coagulum in the final emulsion polymerization product. Additionally, see U.S. Pat. No. 4,224,455.

Thus, there is a need for an emulsion polymerization process for forming polymers and discrete polymeric particles that are well suited for use in coatings (e.g., latex paints, electro-deposition, container, paper and paperboard, can coatings, industrial coatings, automotive coatings, textile coatings), adhesive (e.g., water- and non-water borne adhesives, pressure sensitive adhesives, binders), sealant (e.g. floor finishes, films, binders, non-woven binding materials such as carpet backing, glass fibers) and elastomer (CASE) applications.

SUMMARY OF THE INVENTION

The present invention utilizes a novel group of compounds in the form of ethylenically unsaturated amine salts of sulfonic, phosphoric and carboxylic acids, which display surface activity, i.e. they are surfactants. It has been discovered that these compounds function as reactive surfactants, i.e. surface active agents in polymerization processes, particularly emulsion polymerization processes. The surface active agents of the present invention are capable of polymerizing with themselves (to form homopolymeric surface active agents) and/or are capable of co-polymerizing with other ethylenically unsaturated monomers of the type which are commonly employed in polymerization processes. The polymerizable surface active agents utilized in the present invention are prepared from readily available, economical raw materials, and generally, their preparation does not require any special handling or equipment.

Accordingly, an improved method is provided for forming polymers utilizing polymerizable surface active agents detailed herein. Generally, the improved method comprises:

a) preparing a mixture comprising:
  i) at least one ethylenically unsaturated monomer;
  ii) at least one polymerizable, surface active agent;
  wherein the polymerizable, surface active agent is a salt or quaternary nitrogen compound comprising:
    a) at least one acid, wherein the acid is a sulfonic acid, a carboxylic acid, or a phosphoric acid, or a mixture thereof; and b) at least one nitrogenous base, wherein the nitrogenous base contains at least one nitrogen atom and at least one ethylenically unsaturated moiety; and b) polymerizing the mixture;

wherein the polymerizable, surface active agent is capable of polymerization with itself, copolymerization with the ethylenically unsaturated monomer or co-polymerization with a partially polymerized polymer particle. Somewhat preferably, the nitrogen atom is linked covalently, directly or indirectly, to the ethylenically unsaturated moiety of the nitrogenous base.

The polymers prepared utilizing the polymerizable surface active agents of the present invention may be used as the primary resin component or a minor resin component of a resin mixture which is used to prepare latexes, coatings, adhesives, sealants, elastomers, binders, inks, floor finishes and the like. A polymer is defined herein as a product produced by polymerizing two or more monomers, which may be the same or different. Additionally, the polymer may have incorporated into it, surface active agent monomers and/or homopolymeric surface active agents. The various final compositions, application and polymer products described herein may contain various optional ingredients such as fillers, pigments, colorants, solvents, plasticizers, antioxidants, curing agents, thickeners, non-polymerizable surface active agents (surfactants), preservatives, wet strength additives, and the like.

The present invention provides an improved polymerization process for forming polymers, wherein the polymerizable surface active agent used in the polymerization reaction does not interfere with the quality of the CASE applications. Various classes of polymers formed in the present invention, upon application to textiles, fabrics, and other substrates, may reduce the shrinkage of cotton fabrics, cotton/polyester blend fabrics, cotton/rayon blend fabrics, rayon fabrics, and cellulosic or cellulosic/synthetic blend fabrics.

The present invention provides an improved polymerization process, for making suspension or dispersions of polymers which exhibit enhanced mechanical stability and the ability to withstand freezing and thawing while at the same time retaining good dispersion or suspension.

The present invention provides an improved polymerization process, wherein the resulting polymers exhibit/impart improved adhesion of a CASE to a substrate, e.g. they are substantially resistant to pealing and cracking.

The present invention provides an improved polymerization process, wherein the resulting polymers exhibit/impart improved anti-yellowing properties when employed in a CASE application.

The present invention provides an improved polymerization process, wherein the resulting polymers exhibit/impart improved scrubability properties of a CASE application.

The present invention provides an improved polymerization process, wherein the resulting polymers exhibit/impart improved solvent resistance properties when employed in a CASE application.

The present invention provides an improved polymerization process, wherein the resulting polymers exhibit/impart improved film rewet properties when employed in a CASE application.

The present invention provides an improved polymerization process, wherein coatings formed, using the polymers of the present invention, remain uniform and stable upon the passage of time and/or exposure to moisture at ambient or elevated temperature.

The present invention provides polymers suitable for use in coating, adhesive, sealant and/or elastomer (CASE) applications. The polymers may be in a variety of forms, such as, for example, solids, flakes, powders, semi-solids, thick pastes, flowable/pumpable pastes (i.e. G-phase pastes), liquids, gels, "ringing" gels, dilute or concentrated solutions and the like. The polymers may be spray dried, flaked, extruded, or the like.

The present invention additionally provides homopolymeric surface active agents comprised of polymerized, polymerizable surface active agents or blends of polymerizable surface active agents. These homopolymeric surface active agents are useful in the polymerization processes detailed herein. The present invention further provides homopolymeric surface active agent/polymerizable surface active agent blends comprised of partially polymerized, polymerizable surface active agents and non-polymerized, polymerizable surface active agents. These homopolymeric/polymerizable surface active agent blends are also useful in the polymerization processes detailed herein.

The improved polymerization process of the present invention preferably does not require the use of a surfactant which contains residual formaldehyde or other low molecular weight volatile organic compounds. However, while not usually desirable, low molecular weight volatile organic compounds and/or residual formaldehyde may be present in the polymerization products of the present invention. Further, the polymerization process of the present invention provides latexes with improved shear stability, improved pH stability, improved shelf storage stability and improved ease of viscosity modification.

The polymerizable surface active agent may be added to the mixture in a batch mode (i.e. all at once), a continuous mode (i.e. by addition of an amount of the polymerizable surface active agent throughout the polymerization) or in a semi-continuous mode (i.e. addition of portions of the polymerizable surface active agent at various times during the polymerization).

The polymerizable surface active agents utilized in the present invention are generally formed by combining at least one acid, wherein the acid is a sulfonic acid, a carboxylic acid, or a phosphoric acid, or a mixture thereof, with a nitrogenous base, wherein the nitrogenous base contains at least one nitrogen atom and at least one ethylenically unsaturated moiety. The polymerizable surface active agents of the present invention generally contain a quaternary nitrogen atom and are in the form of salts or quaternary nitrogen compounds.

Various functional groups may be incorporated in the polymerizable surfactants of the present invention, in either the acid or the nitrogenous base, to form specialty polymerizable surface active agents. These specialty polymerizable surface active agents may posses various properties such as, for example, biocidal activity, herbicidal activity, pesticidal activity, anti-static activity and the like, either before or after polymerization with known monomers or polymerization with themselves. Additionally, the polymerizable surface active agents of the present invention may be utilized in forming biodegradable polymers, photoreactive polymers, sunscreen enhancing polymers, fabric softening polymers, polyol polymers, ophthalmic polymers, lubricants and the like.

These and other objects and advantages, as well as the scope, nature, and utilization of the claimed invention will become apparent to those skilled in the art from the following detailed description and claims.

BRIEF DESCRIPTION OF THE DRAWINGS

FIG. I is a partial $^1$H NMR spectrum, showing the region of δ 5.0–8.0, of the allylamine salt of dodecylbenzenesulfonic acid (ADDBS).

FIG. II is a partial $^1$H NMR spectrum, showing the region of δ 5.0–8.0, of a latex formulation prepared according to Example #1.

DETAILED DESCRIPTION OF THE INVENTION

Figure 1:
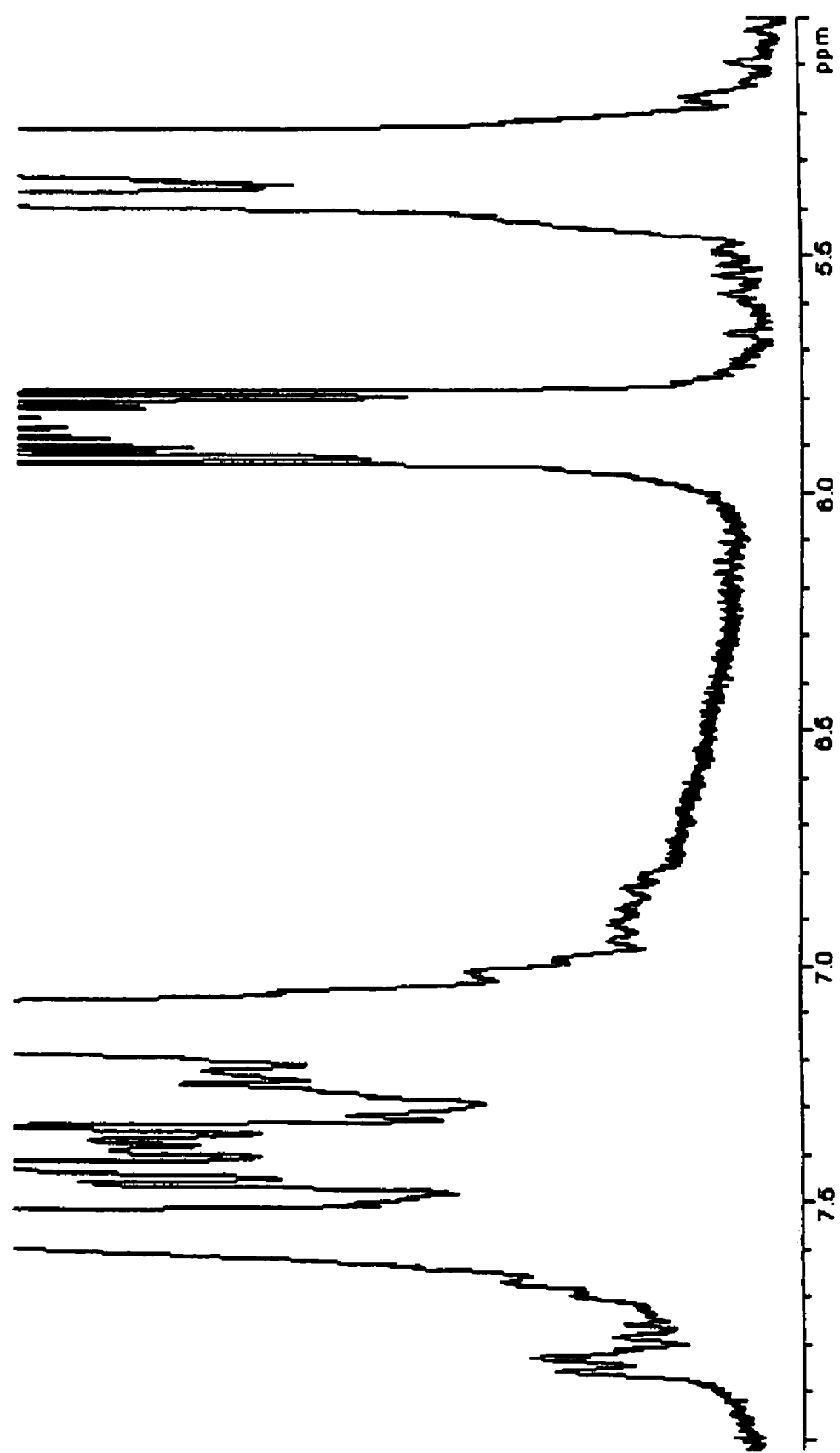

A method is provided for forming polymers utilizing polymerizable surface active agents, wherein the method comprises: (1) preparing a mixture comprising at least one ethylenically unsaturated monomer and at least one polymerizable surface active agent; and (2) polymerizing the mixture. Generally, any ethylenically unsaturated monomer that is capable of undergoing polymerization may be utilized in the present invention. The method of the present invention is particularly well suited to emulsion polymerization but may also be conducted as a solution polymerization, suspension polymerization, micro emulsion polymerization or inverse emulsion polymerization. The polymerization may be conducted in any manner known to the art, including but not limited to, free-radical initiated polymerization, thermal initiated polymerization and redox initiated polymerization using, for example, batch, continuous, or controlled monomer feed processes, known conditions of stirring time and temperature, and known kinds of additives such as initiators, surfactants, electrolytes, pH adjusting agents, buffering agents, protective colloids and the like. In general, the polymerization process of the present invention will be carried out from about 20° C. to about 120° C. (e.g., between about 50° C. and about 110° C.). These polymerization temperatures will vary with respect to the reactivity and concentration of the polymerization initiator being used. Batch polymerization times may vary depending on the method of polymerization and the monomers being polymerized. Such times may vary from about 2 to about 10 hours. In general, the mixture may be a solution, emulsion, suspension or dispersion of the ethylenically unsaturated monomer and the polymerizable surface active agent. Further, the polymerizable surface active agent may be provided to the mixture as an aqueous solution.

In accordance with the present invention, polymerization may occur simultaneously as the mixture is being formed (i.e. as the monomer and the polymerizable surface active agent come in contact, a self-initiating polymerization occurs). Accordingly, the present invention also encompasses a method for continuous polymerization, utilizing at least one ethylenically unsaturated monomer and at least one polymerizable surface active agent.

The polymerizable, surface active agents utilized in the present invention are salts or quaternary nitrogen compounds comprising:

a) at least one acid, wherein the acid is a sulfonic acid, a carboxylic acid, or a phosphoric acid, or a mixture thereof; and b) at least one nitrogenous base, wherein the nitrogenous base contains at least one nitrogen atom and at least one ethylenically unsaturated moiety.

The polymerizable surface active agents are generally capable of polymerization with themselves, copolymerization with the ethylenically unsaturated monomer or co-polymerization with a partially polymerized polymer particle. In a somewhat preferred embodiment, the polymerizable surface active agent is partially (i.e. 1–50 percent by weight of the polymerizable surface active agent) consumed by polymerization with itself, co-polymerization with the monomer and/or co-polymerization with a partially polymerized polymer particle. In a more preferred embodiment, the polymerizable, surface active agent is substantially (i.e. 50–90 percent by weight of the polymerizable surface active agent) consumed by polymerization with itself, co-polymerization with the monomer and/or co-polymerization with a partially polymerized polymer particle. In a most preferred embodiment, the polymerizable, surface active agent is substantially completely (i.e. greater than 90 percent by weight of the polymerizable surface active agent) consumed by polymerization with itself, co-polymerization with the monomer and/or co-polymerization with a partially polymerized polymer particle.

The polymerizable surface active agent and the monomer are generally combined in a ratio of about 0.01:1 to about 3:1 on a weight basis. In a preferred embodiment, the polymerizable surface active agent is present in the mixture in a concentration of about 1–100 weight percent, based on the total weight of the ethylenically unsaturated monomer present in the mixture. In a more preferred embodiment, the polymerizable surface active agent is present in the mixture in a concentration of about 1–20 weight percent, based on the total weight of the ethylenically unsaturated monomer present in the mixture.

In general, the method of preparing polymers in accordance with the present invention does not require the use of a non-polymerizable surfactant, i.e. the mixture is substantially free of non-polymerizable, surface active agents. However, in a somewhat less preferred embodiment, the mixture further comprises a supplemental, non-polymerizable surfactant (iii); wherein the supplemental surfactant is a sodium, potassium, calcium, magnesium, or ammonium salt of a substantially saturated anionic surfactant, or a nonionic, cationic, or amphoteric surfactant, or a mixture thereof; and wherein the supplemental surfactant is provided in a concentration of about 0.01 to about 20.0 percent by weight, based on the total weight of polymerizable surface active agent and supplemental surfactant provided in the reaction zone.

The present invention provides pre-polymerization mixtures comprising (1) at least one ethylenically unsaturated monomer; and (2) at least one polymerizable surface active agent; wherein the ethylenically unsaturated monomer and the polymerizable surface active agent are defined as above or below. This pre-polymerization mixture may be polymerized by a variety of initiation methods known to the art.

The present invention provides polymers comprising: (1) at least one monomer unit; and (2) at least one surface active agent unit; wherein the monomer unit is derived from an ethylenically unsaturated monomer; wherein the surface active agent is derived from a polymerizable surface active agent; and wherein the ethylenically unsaturated monomer and the polymerizable surface active agent have co-polymerized to form the polymer.

In another embodiment, the present invention provides a method for forming polymers, wherein the method comprises (1) preparing a mixture comprising at least one ethylenically unsaturated monomer, at least one acid, wherein the acid is a sulfonic acid, a carboxylic acid, or a phosphoric acid, or a mixture thereof, and at least one nitrogenous base, wherein the nitrogenous base contains at least one nitrogen atom and at least one ethylenically unsaturated moiety; and (2) polymerizing the mixture. In accordance with this embodiment, the acid and the nitrogenous base may form a polymerizable, surface active agent in situ; wherein the polymerizable, surface active agent is a salt or quaternary nitrogen compound; wherein the polymerizable surface active agent is capable of polymerization with itself, copolymerization with the ethylenically unsaturated monomer and/or co-polymerizing with a partially polymerized polymer particle; and wherein the polymerizable, surface active agent is substantially completely consumed by polymerization with itself, co-polymerization with the monomer and/or co-polymerization with a partially polymerized polymer particle. In one alternative, the nitrogenous base may partially or completely co-polymerize with the ethylenically unsaturated monomer, followed by formation of a surface active agent (i.e. complexation/salt formation with the acid). Without being bound by any particular theory, it is believed that the nitrogenous base is incorporated into the polymer back-bone and the acid forms an ion pair, i.e. a salt, with the nitrogen atom of the nitrogenous base, thereby adhering to the polymer and forming a positively charged nitrogen atom. In another alternative within the purview of this embodiment, a portion of the nitrogenous base may polymerize with itself, co-polymerizes with the ethylenically unsaturated monomer or co-polymerize with a partially polymerized polymer, followed by complexation/salt formation with the acid. In another alternative, the nitrogenous base may partially or completely co-polymerize with a homopolymeric surfactant, followed by complexation/salt formation with the acid.

The present invention provides polymers comprising: (1) at least one monomer unit; (2) at least one acid, wherein the acid is a sulfonic acid, a carboxylic acid, or a phosphoric acid, or a mixture thereof; and at least one nitrogenous base, wherein the nitrogenous base contains at least one nitrogen atom and at least one ethylenically unsaturated moiety; wherein the monomer unit is derived from an ethylenically unsaturated monomer; wherein the nitrogenous base is homopolymerized, co-polymerized with the monomer, and/or polymerized with a partially polymerized polymer, wherein the acid complexes to the nitrogen atom(s), to form a salt- or a quaternary nitrogen-containing polymer.

In another embodiment, the present invention provides a method for forming polymers, wherein the method comprises: (1) preparing a mixture comprising at least one ethylenically unsaturated monomer and at least one homopolymeric surface active agent, the homopolymeric surface active agent being a polymer formed by polymerizing at least one polymerizable, surface active agent; wherein the polymerizable, surface active agent is a salt or quaternary nitrogen compound comprising at least one acid, wherein the acid is a sulfonic acid, a carboxylic acid, or a phosphoric acid, or a mixture thereof, and at least one nitrogenous base, wherein the nitrogenous base contains at least one nitrogen atom and at least one ethylenically unsaturated moiety; and (2) polymerizing the mixture.

The present invention provides homopolymeric surface active agents. These homopolymeric surface active agents are formed by polymerizing at least one polymerizable, surface active agent, wherein the polymerizable, surface active agent is a salt or quaternary nitrogen compound comprising at least one acid, wherein the acid is a sulfonic acid, a carboxylic acid, or a phosphoric acid, or a mixture thereof; and at least one nitrogenous base, wherein the nitrogenous base contains at least one nitrogen atom and at least one ethylenically unsaturated moiety. Optionally, the homopolymeric surface active agents may be formed by partially or completely polymerizing the nitrogenous base, followed by complexation of the resulting polymer with the acid, wherein the acid complexes to the nitrogen atom(s), to form a salt- or a quaternary nitrogen-containing homopolymeric surface active agent.

The homopolymeric surface active agents of the invention are generally capable of polymerization with themselves, co-polymerization with the monomer or co-polymerization with a partially polymerized polymer.

In another embodiment, the present invention provides a method for forming polymers, wherein the method comprises: (1) partially polymerizing at least one ethylenically unsaturated monomer to form a partially polymerized polymer/monomer mixture; (2) adding to the partially polymerized polymer/monomer mixture at least one polymerizable surface active agent and/or at least one homopolymeric surface active agent, to form a partially polymerized polymer/monomer/surface active agent mixture; and (3) polymerizing the partially polymerized polymer/monomer/surface active agent mixture; wherein the homopolymeric surface active agent being a polymer formed by polymerizing at least one polymerizable, surface active agent; wherein the polymerizable, surface active agent is a salt or quaternary nitrogen compound comprising at least one acid, wherein the acid is a sulfonic acid, a carboxylic acid, or a phosphoric acid, or a mixture thereof, and at least one nitrogenous base, wherein the nitrogenous base contains at least one nitrogen atom and at least one ethylenically unsaturated moiety.

In another embodiment, the present invention provides a method for forming polymers, wherein the method comprises: (1) preparing a mixture comprising at least one ethylenically unsaturated monomer and at least one non-polymerizable, supplemental surface active agent; (2) partially polymerizing the mixture to form a partially polymerized polymer/monomer/supplemental surface active agent mixture; (3) adding to the partially polymerized polymer/monomer/supplemental surface active mixture at least one polymerizable surface active agent and/or at least one homopolymeric surface active agent, to form a partially polymerized polymer/monomer/supplemental surface active agent/polymerizable surface active agent mixture; and (4) polymerizing the partially polymerized polymer/monomer/surface active agent/polymerizable surface active agent mixture; wherein the homopolymeric surface active agent being a polymer formed by polymerizing at least one polymerizable, surface active agent; wherein the polymerizable, surface active agent is a salt or quaternary nitrogen compound comprising at least one acid, wherein the acid is a sulfonic acid, a carboxylic acid, or a phosphoric acid, or a mixture thereof, and at least one nitrogenous base, wherein the nitrogenous base contains at least one nitrogen atom and at least one ethylenically unsaturated moiety; and wherein the supplemental surface active agent is generally non-polymerizable and is defined herein.

In another embodiment, the present invention provides a method for forming polymers, and suspension or dispersions of polymers, wherein the method comprises: (1) preparing a mixture comprising at least one ethylenically unsaturated monomer and at least one non-polymerizable, supplemental surface active agent; (2) polymerizing the mixture to form a polymer mixture; and (3) adding at least one polymerizable surface active agent and/or at least one homopolymeric surface active agent to the polymer mixture; wherein the homopolymeric surface active agent being a polymer formed by polymerizing at least one polymerizable, surface active agent; wherein the polymerizable, surface active agent is a salt or quaternary nitrogen compound comprising at least one acid, wherein the acid is a sulfonic acid, a carboxylic acid, or a phosphoric acid, or a mixture thereof, and at least one nitrogenous base, wherein the nitrogenous base contains at least one nitrogen atom and at least one ethylenically unsaturated moiety.

The present invention encompasses polymers prepared by any of the methods or processes described herein. Generally, the methods of the present invention encompass, emulsions, suspensions or dispersion of polymer obtained therefrom.

Ethylenically Unsaturated Monomers

The ethylenically unsaturated monomer or monomers that may be polymerized or copolymerized according to the present invention are known to the art and are described below in a representative manner. Examples of suitable ethylenically unsaturated monomers are, for example, mono- and polyunsaturated hydrocarbon monomers, vinyl esters (e.g., vinyl esters of $C_1$ to $C_6$ saturated monocarboxylic acids), vinyl ethers, monoethylenically unsaturated mono- and polycarboxylic acids and there alkyl esters (e.g., acrylic acid esters and methacrylic acid esters, particularly the $C_1$ to $C_{12}$ alkyl, and more particularly the $C_1$ to $C_4$ alkyl esters), the nitriles, vinyl and vinylidene halides, and amides of unsaturated carboxylic acids and amino monomers.

Examples of suitable hydrocarbon monomers for use in the present invention include styrene compounds (e.g., styrene, carboxylated styrene, and alpha-methyl styrene), ethylene, propylene, butylene, and conjugated dienes (e.g., butadiene, isoprene and copolymers of butadiene and isoprene). Examples of vinyl and vinylidene halides include vinyl chloride, vinylidene chloride, vinyl fluoride and vinylidene fluoride.

Examples of acrylic esters and methacrylic esters suitable for use in the present invention include $C_1$–$C_{12}$ (e.g., $C_1$–$C_4$) alkyl acrylates and methacrylates. Typical alkyl esters and methacrylic esters include methyl acrylate, methyl methacrylate, ethyl acrylate, ethyl methacrylate, isopropyl acrylate, isopropyl methacrylate, n-butyl acrylate, n-butyl methacrylate, isobutyl acrylate, isobutyl methacrylate, hexyl acrylate, 2-ethylhexyl acrylate, 2-ethylhexyl methacrylate, t-butyl acrylate, t-butyl methacrylate, 3,3-dimethylbutyl acrylate, 3,3-dimethyl butyl methacrylate, and lauryl acrylate.

Suitable vinyl esters for use in the present invention include aliphatic vinyl esters, such as vinyl formate, vinyl acetate, vinyl propionate, vinyl butyrate, vinyl isobutyrate, vinyl valerate, and vinyl caproate, and allyl esters of saturated monocarboxylic acids, such as allyl acetate, allyl propionate and ally lactate.

Vinyl ethers suitable for use in the present invention include methylvinyl ether, ethylvinyl ether and n-butylvinyl ether. Typically vinyl ketones include methylvinyl ketone, ethylvinyl ketone and isobutylvinyl ketone. Suitable dialkyl esters of monoethylenically unsaturated dicarboxylic acids include dimethyl maleate, diethyl maleate, dibutyl maleate, dioctyl maleate, diisooctyl maleate, dinonyl maleate, diisodecyl maleate, ditridecyl maleate, dimethyl fumarate, diethyl fumarate, dipropyl fumarate, dibutyl fumarate, dioctyl fumarate, diisooctyl fumarate, didecyl fumarate, dimethyl itaconate, diethyl itaconate, dibutyl itaconate, and dioctyl itaconate.

Monoethylenically unsaturated monocarboxylic acids suitable for use in the present invention include acrylic acid, methacrylic acid, ethacrylic acid, and crotonic acid. Suitable monoethylenically unsaturated dicarboxylic acids include maleic acid, fumaric acid, itaconic acid and citraconic acid.

Suitable monoethylenically unsaturated tricarboxylic acids include aconitic acid and the halogen-substituted derivatives (e.g., alphachloracylic acid), and the anhydrides of these acids (e.g., maleic anhydride and citraconic anhydride).

Nitriles of the above ethylenically unsaturated mono-, di- and tricarboxylic acids which are suitable monomers include acrylonitrile, alpha-chloroacrylonitrile and methacrylonitrile. Suitable amides of these carboxylic acids include unsubtituted amides such as acrylamide, methacrylamide and other alpha-substituted acrylamides and N-substituted amides obtained by the reaction of the amides of the aforementioned mono- and polycarboxylic acids with and aldehyde (e.g., formaldehyde). Typical N-substituted amides include N-methylolacrylamide, N-methylolmethacrylamide alkylated N-methylolacrylamides and N-methylolmethacrylamides (e.g., N-methyoxymethylacrylamide and N-methoxymethylmethacrylamide).

Amino monomers useful in the present invention include substituted and unsubstituted aminoalkyl acrylates, hydrochloride salts of amino monomers and methacrylates, such as beta-aminoethylacrylate, beta-amino-ethylmethacrylate, dimethylaminomethylacrylate, beta-methylaminoethylacrylate, and dimethylaminomethylmethacrylate.

Hydroxy-containing monomers useful in the present invention include beta-hydroxyethylacrylate, beta-hydroxypropylacrylate, gamma-hydroxypropylacrylate and beta-hydroxyethylmethacrylate.

Monomers useful in the present invention may be homopolymerized or copolymerized, i.e., one or more different monomers capable of polymerization may be used.

Polymerizable Surface Active Agents

The polymerizable surface active agents utilized in the present invention are salts or quaternary nitrogen compounds comprising at least one acid, wherein the acid is a sulfonic acid, a carboxylic acid, or a phosphoric acid, or a mixture thereof, and at least one nitrogenous base, wherein the nitrogenous base contains at least one nitrogen atom and at least on ethylenically unsaturated moiety. The polymerizable surface active agents is usually present in the mixture in a concentration from about 0.01–100.0 percent by weight based on the total weight of the ethylenically unsaturated monomer. In general, although not required, the polymerizable surface active agents have a homophilic/lipophilic balance (HLB) of less than about 45. In a somewhat more preferred embodiment, the polymerizable surface active agents have an HLB of about 5–40. The polymerizable surface active agents are generally capable of polymerization with themselves, co-polymerization with the ethylenically unsaturated monomer, or co-polymerization with a partially polymerized polymer.

More specifically, while the nitrogenous base may be capable of some degree of surface activity, in the present invention it is the acid portion of the polymerizable surfactant that is responsible for the surfactant character and the HLB of the compound. In preferred embodiments, the nitrogenous base contributes little or no surfactant character to these materials. In other words, the acids are generally capable of acting as surfactants when they are present as anions of the acid and the associated counterion is any positively charged species. The most common positively charged species are sodium, potassium, ammonium, calcium and magnesium ions. In fact, the acid portion of the polymerizable surfactant may be supplied as a sodium, potassium, or other salt of the carboxylic, phosphoric or sulfonic acid and then combined with the nitrogenous base to form the inventive surfactant.

The polymerizable surface active agents of the present invention are prepared from readily available, economical raw materials, and generally, their preparation does not require any special handling or equipment. The polymerizable surface active agents may be prepared in a batch mode or a continuous mode; they may be prepared by contacting nitrogenous base with the acid or contacting the acid with the nitrogenous base. By contacting it is meant that the acid(s) is added to the nitrogenous base and the components are mixed, or the ethylenically unsaturated amine(s) is added to the acid(s) and the components are mixed. The acid may be present as an anion and the base may be present as a cation (i.e. a quaternary nitrogen) in the mixture. The acid and nitrogenous base are in the form of salts or quaternary nitrogen compounds. As known by one skilled in the art, upon mixing the acid and nitrogenous base together, the nitrogenous base becomes a conjugate acid and the acid becomes a conjugate base.

The surface active agents and blends of surface active agents may be prepared in a variety of forms such as, for example, liquids, solutions, solids, powders, flakes, semi-solids, gels, "ringing" gels, G-phase liquids, hexagonal phase solids, or thick pastes. The surface active agents may be spray dried, flaked, extruded, and the like. Although not critical to the present invention, the polymerizable surface active agents may be prepared "neat" or in a conventional solvent such as water, low molecular weight alcohol or hydrocarbon, or a mixture thereof, to produce a solution of the polymerizable surface active agent. The present invention encompasses polymerizable surface active agents as salts in dry form and as aqueous solutions. The polymerizable surface active agents may be isolated by drying a solution of the surface active agents; a solution of polymerizable surface active agents may be prepared by dissolving a solid form of the polymerizable surface active agent (i.e. a salt) in water, low molecular weight alcohol or hydrocarbon, or a mixture thereof.

Polymerizable surface active agents of the present invention may be prepared and mixed together to produce a surface active mixture comprising "neat" surface active agents or an aqueous surfactant blend. Additionally, neat or aqueous blends of the polymerizable surface active agents may be prepared by contacting a blend of two or more nitrogenous bases with one acid, or by contacting a blend of two or more nitrogenous bases with a blend of 2 or more acids. Conversely, blends of the polymerizable surface active agents may be prepared by contacting a blend of two or more acids with one nitrogenous base, or by contacting a blend of two or more acids with a blend of two or more nitrogenous bases.

The polymerizable surface active agents utilized in the present invention may be homopolymerized (i.e. polymerized with themselves), or partially homopolymerized, prior to use in the polymerization, to form a homopolymeric surface active agent or a blend of homopolymeric surface active agent(s) and polymerizable surface active agents.

Further, the polymerizable surface active agents utilized in the present invention are also useful, for example, in detergents (e.g., laundry detergents, dish detergents, automatic dishwasher detergents, etc.), shampoos, 2-in-1 shampoos, 3-in-1 shampoos, cleansers, soaps, liquid hand soaps, body washes, agricultural herbicide and pesticide formulations and the like.

The acids useful in the present invention are generally sulfonic acids, polysulfonic acids, sulfonic acids of oils, paraffin sulfonic acids, lignin sulfonic acids, petroleum sulfonic acids, tall oil acids, olefin sulfonic acids, hydroxy-olefin sulfonic acids, polyolefin sulfonic acids, polyhydroxy polyolefin sulfonic acids, carboxylic acids, perfluorinated carboxylic acids, carboxylic acid sulfonates, alkoxylated carboxylic acid sulfonic acids, polycarboxylic acids, polycarboxylic acid polysulfonic acids, alkoxylated polycarboxylic acid polysulfonic acids, phosphoric acids, alkoxylated phosphoric acids, polyphosphoric acids, and alkoxylated polyphosphoric acids, fluorinated phosphoric acids, phosphoric acid esters of oils, phosphinic acids, alkylphosphinic acids, aminophosphinic acids, polyphosphinic acids, vinyl phosphinic acids, phosphonic acids, polyphosphonic acids, phosphonic acid alkyl esters, α-phosphono fatty acids, oragnoamine polymethylphosphonic acids, organoamino dialkylene phosphonic acids, alkanolamine phosphonic acids, trialkyledine phosphonic acids, acylamidomethane phosphonic acids, alkyliminodimethylene diphosphonic acids, polymethylene-bis(nitrilo dimethylene)tetraphosphonic acids, alkyl bis(phosphonoalkylidene) amine oxide acids, esters of substituted aminomethylphosphonic acids, phosphonamidic acids, acylated amino acids (e.g., amino acids reacted with alkyl acyl chlorides, alkyl esters or carboxylic acids to produce N-acylamino acids), N-alkyl acylamino acids, and acylated protein hydrolysates, and mixtures thereof.

Other acids which are useful in the present invention are selected from the group comprising linear or branched alkylbenzene sulfonic acids, alkyl sulfuric acid esters, alkoxylated alkyl sulfuric acid esters, α-sulfonated alkyl ester acids, α-sulfonated ester diacids, alkoxylated α-sulfonated alkyl ester acids, α-sulfonated dialkyl diester acids, di-α-sulfonated dialkyl diester acids, α-sulfonated alkyl acetate acids, primary and secondary alkyl sulfonic acids, perfluorinated alkyl sulfonic acids, sulfosuccinic mono- and diester acids, polysulfosuccinic polyester acids, sulfoitaconic diester acids, sulfosuccinamic acids, sulfosuccinic amide acids, sulfosuccinic imide acids, phthalic acids, sulfophthalic acids, sulfoisophthalic acids, phthalamic acids, sulfophthalamic acids, alkyl ketone sulfonic acids, hydroxyalkane-1-sulfonic acids, lactone sulfonic acids, sulfonic acid amides, sulfonic acid diamides, alkyl phenol sulfuric acid esters, alkoxylated alkyl phenol sulfuric acid esters, alkylated cycloalkyl sulfuric acid esters, alkoxylated alkylated cycloalkyl sulfuric acid esters, dendritic polysulfonic acids, dendritic polycarboxylic, acids, dendritic polyphosphoric acids, sarcosinic acids, isethionic acids, and tauric acids, and mixtures thereof.

Additionally in accordance with the present invention, suitable acids of the present invention include fluorinated carboxylic acids, fluorinated sulfonic acids, fluorinated sulfate acids, fluorinated phosphonic and phosphinic acids, and mixtures thereof.

Due to their inherent hydrolytic instability, the sulfuric acid esters are preferably immediately converted to ethylenically unsaturated amine salts. For example, linear dodecyl alcohol is sulfated with $SO_3$ to produce an intermediate, hydrolytically unstable, dodecyl alcohol sulfate acid as shown in Scheme I below. The intermediate acid is neutral ized with an ethylenically unsaturated nitrogenous base, such as allyl amine, to produce a dodecyl sulfate ethylenically unsaturated amine salt.

Scheme I:
Formation of Dodecyl Sulfate Ethylenically Unsaturated Amine Salt

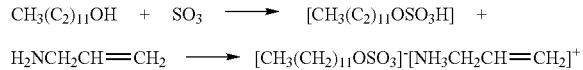

Additionally, for example, methyl laurate is sulfonated with $SO_3$ to produce an intermediate α-sulfonated lauryl methyl ester acid, as shown in Scheme II below. This acid is neutralized with an ethylenically unsaturated nitrogenous base, such as allyl amine, to produce an α-sulfonated lauryl methyl ester ethylenically unsaturated amine salt. Additionally, an α-sulfonated lauryl methyl ester ethylenically unsaturated amine di-salt may be produced as shown below in Scheme III. The α-sulfonated lauryl methyl ester ethylenically unsaturated amine salt and the α-sulfonated lauryl fatty acid ethylenically unsaturated amine di-salt may be formed as a mixture depending on the sulfonation conditions employed. The ratio of unsaturated amine salt to unsaturated amine di-salt is readily controlled by sulfonation conditions, well known to those skilled in the art.

Scheme II:
Formation of α-Sulfonated Lauryl Methyl Ester Ethylenically Unsaturated Amine Salt

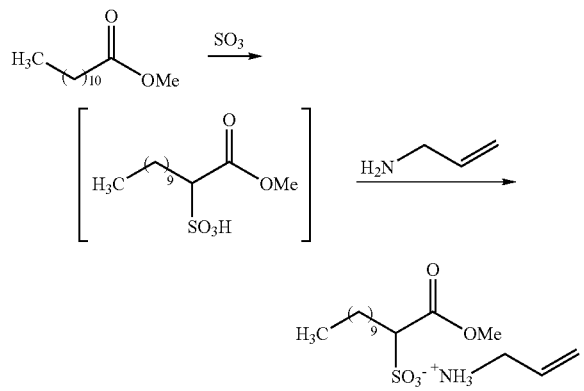

Scheme III:
Formation of α-Sulfonated Lauryl Methyl Ester Ethylenically Unsaturated Amine Di-Salt

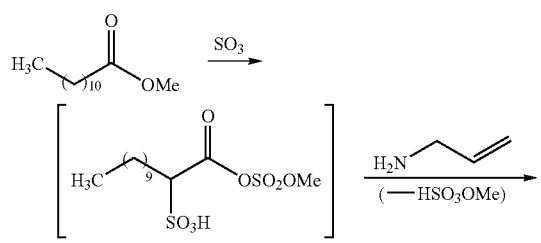

-continued

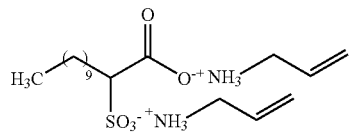

Ethylenically unsaturated amine salts of sulfosucinnate ester acids are typically produced by sulfitation of a succinic acid alkyl diester with sodium bisulfite, followed by, for example, ionic exchange with an ethylenically unsaturated nitrogenous base, such as allyl amine, as shown in Scheme IV below.

Scheme IV:
Formation of a Sulfosuccinate Ester Ethylenically Unsaturated Salt

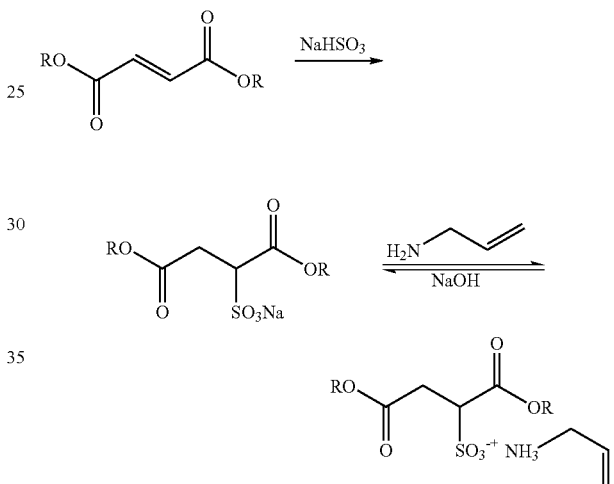

The sarcosinic acid ethylenically unsaturated amine salts are prepared by the amidation of a fatty acid, a fatty acid alkyl ester or a fatty acid chloride with sarcosine, followed by addition of an ethylenically unsaturated nitrogenous base, such as allyl amine, as shown in Scheme V below. Optionally, and somewhat less preferably, the ethylenically unsaturated nitrogenous base is combined with sarcosine to produce the corresponding sarcosine salt, which is then be used to amidate the fatty acid, fatty acid alkyl ester or fatty acid chloride.

Scheme V:
Formation Of A Fatty Sarcosinate Acid Ethylenically Unsaturated Amine Salt

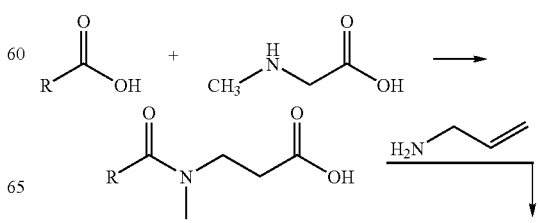

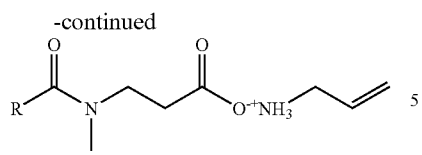

The isethionic acid ethylenically unsaturated amine salts may be prepared by the esterification of a fatty acid, a fatty acid alkyl ester or a fatty acid chloride with isethionic acid, followed by addition of an ethylenically unsaturated nitrogenous base, such as allyl amine, as shown in Scheme VI below. Additionally, isethionic acid ethylenically unsaturated amine salts may be prepared by esterifying a fatty acid, a fatty acid alkyl ester or a fatty acid chloride with the sodium salt of isethionic acid, followed by ion exchange with the ethylenically unsaturated nitrogenous base, such as allyl amine. Optionally, isethionic acid, or its sodium salt, may be combined with the ethylenically unsaturated nitrogenous base, such as allyl amine, to produce the isethionic acid allyl amine salt, which may then be esterified with a fatty acid, a fatty acid alkyl ester or a fatty acid chloride.

Scheme VI:
Formation Of An Isethionic Acid Ethylenically Unsaturated Amine Salt

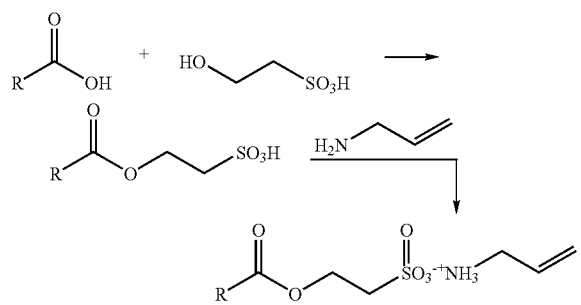

The preferred acids of the present invention are branched or linear alkylbenzene sulfonic acids, alkyl sulfuric acid esters, alkoxylated alkyl sulfuric acid esters, α-sulfonated alkyl ester acids, fatty carboxylic acids and phosphoric acid esters, and mixtures thereof. The most preferred acids of the present invention are branched or linear alkylbenzene sulfonic acids, alkyl sulfuric acid esters, and alkoxylated alkyl sulfuric acid esters, and mixtures thereof.

Other useful surfactants in accordance with the present invention include sulfonic acid salts of ethylenically unsaturated amines, derived from sultone precursors, such as cyclic alkyl sultones. Examples of these sultone-derived sulfonic acid salts (e.g., allyl amine salts) include 2-acetamidoalkyl-1-sulfonates and amino carboxy acid alkyl sulfonates, as shown in Scheme VII and Scheme VIII below.

Scheme VII:
2-Acetamidoalkyl-1-Sulfonic Acid Allyl Amine Salts

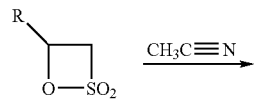

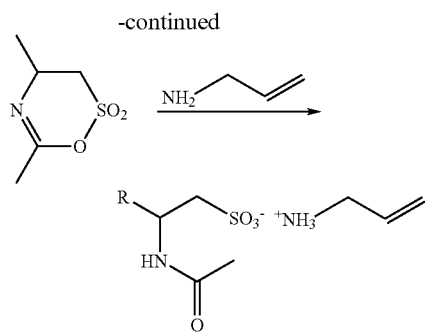

Scheme VIII:
Amino Carboxy Acid Alkyl Sulfonic Acid Allyl Amine Salts

In general, nitrogenous bases, which are useful in the present invention are any nitrogenous base which contains an ethylenically unsaturated moiety, including various vinyl amines. The nitrogenous base useful in accordance with the present invention is a compound of the formula

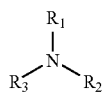

wherein $R_1$, $R_2$ and $R_3$ are independently hydrogen or organic groups containing an ethenylene group, provided that at least one of $R_1$–$R_3$ is a straight or branched chain alkyl group containing 1–8 carbon atoms and an ethenylene functionality.

Additionally, other examples of nitrogenous bases that are useful in the present invention are ethylenically unsaturated amines selected from the group comprising vinyl amine, N-methyl N-allyl amine, $C_1$–$C_{24}$ alkyl allyl amine, $C_1$–$C_{24}$ alkyl ethoxylated and/or propoxylated allyl amine, $C_1$–$C_{24}$ dialkyl allyl amine, ethoxylated and/or propoxylated allyl amine diallyl amine, $C_1$–$C_{24}$ alkyl diallyl amine, ethoxylated and/or propoxylated diallyl amine, triallyl amine, 1,2-diaminoethene, aminocrotonitrile, diaminomaleonitrile, N-allylcyclopentylamine, N-allylaniline, allylcyclohexylamine, [1-(2-allylphenoxy)-3-(isopropylamino)-2-propanol], 3-amino-2-butenethioamide, bis[4-(dimethylamino)-benzylidene] acetone, 1,4-butanediol bis(3-aminocrotonate), 3-amino-1-propanol vinyl ether, 2-(diethylamino)ethanol vinyl ether, 4-(diethylamino)cinnamaldehyde, 4-(diethylamino)cinnamonitrile, 2-(diethylamino)ethyl methacrylate, diethyl (6-methyl-2-pyridylaminomethylene)maleate, 3-(dimethylamino)acrolein, 2-(dimethylamino)ethyl methacrylate, 4-dimethylaminocinnamaldehyde, 2-(dimethylamino)ethyl acrylate, 3-(dimethylamino)-2-methyl-2-propenal, 9-vinylcarbazole, N-vinylcaprolactam, 1-vinylimidazole, 2-vinylpyridine, 4-vinylpyridine, allylcyclohexylamine, N-allylcyclopentylamine, allyl(diisopropylamino)dimethylsilane, 1-allylimidazole, 1-vinyl-2-pyrrolidinone, N-[3-(dimethylamino)propyl]methacrylamide, 4-[4-(dimethylamino)styryl]pyridine, 2-[4-(dimethylamino)styryl]pyridine, 2-[4-(1,2-diphenyl-1-butenyl)phenoxy]-N,N-dimethylethylamine, 2-[4-dimethylamino)styryl]-benzothiozole, 5-[4-(dimethylamino)phenyl]-2,4-pentandienal, (dimethylamino-methylene)malononitrile, 4-dimethylaminocinnamonitrile, 4-(dimethylamino)chalcone, [6-(3,3-dimethylallylamino-purine riboside, 3,7-dimethyl-2,6-octadien-1-ylamine, 2-isopropenylaniline, isopropyl 3-aminocrotonate, S-{2-[3-(hexyloxy)benzoyl]-vinyl}glutathione, methyl 3-aminocrotonate, N-methylallylamine, N-methyl-1-(methylthio)-2-nitroetheneamine, oleylamine, tetrakis(dimethylamino)ethylene, 5-[(6,7,8-trimethoxy-4-quinazolinyl)amino]-1-pentanol nitrate ester, tris(2-methylallyl)amine, N,N,N',N'-tetramethyl-2-butene-1,4-diamine, S-{2-[3-(octyloxy)benzoy]vinyl}-glutathione, 4,4'-vinylidene-(N,N-dimethylaniline), 2',5'-dimethoxy-4-stilbenamine, 3-(dimethylamino)propyl acrylate, 3-dimethylaminoacrylonitrile, 4-(dimethylamino)-cinnamic acid, 2-amino-1-propene-1,1,3-tricarbonitrile, 2-amino-4-pentenoic acid, N,N'-diethyl-2-butene-1,4-diamine, 10,11-dihyro-N,N-dimethyl-5-methylene-5H-dibenzo[a,d]-cyclohepene-10-ethanamine maleate, 4-(dicyanomethylene)-2-methyl-6-(4-dimethyl-aminostyryl)-4H-pyran, N-ethyl-2-methylallylamine, ethyl 3-aminocrotonate, ethyl-α-cyano-3-indoleacrylate, ethyl-3-amino-4,4-dicyano-3-butenoate, 1,3-divinyl-1,1,3,3-tetramethyldisilazane, N-(4,5-dihydro-5-oxo-1-phenyl-1H-pyrazol-3-yl)-9-octadecen-amide, and N-oleoyl-tryptophan ethyl ester, and mixtures thereof.

More preferred nitrogenous bases of the present invention are allyl amine, diallyl amine, triallyl amine, methylallyl amine, allyldimethyl amine, methyl 3-amino crotonate, 3-amino crotononitrile, 3-amino-1-propanol vinyl ether, N-methyl N-allyl amine, 2-(dimethylamino)ethyl acrylate, or 1,4-diamino-2-butene, and mixtures thereof. The most preferred nitrogenous bases of the present invention are allyl amine, diallyl amine, triallyl amine, methallyl amine, N-methyl N-allyl amine, and 2-(dimethylamino)ethyl acrylate, and mixtures thereof.

Accordingly, the present invention utilizes surface active agents of the formula:

$$(R_1)_n-Ar(SO_3^-M^+)_m$$

wherein $R_1$ is a saturated or unsaturated hydrocarbon group having from about 1–24 carbon atoms; wherein Ar is a phenyl, polyphenyl, napthyl, polynapthyl, styryl, or polystyryl group, or a mixture thereof; wherein $M^+$ is a conjugate acid of the nitrogenous base; wherein n=1–5 and m=1–8; and wherein the total number of carbon atoms represented by $(R_1)_n$ is at least 5. In a preferred embodiment $R_1$ is a saturated or unsaturated hydrocarbon group having from about 6–24 carbon atoms, Ar is a phenyl, $M^+$ is a conjugate acid of the nitrogenous base, the nitrogenous base selected from the group consisting of allyl amine, diallyl amine, triallyl amine, methallyl amine, N-methyl N-allyl amine or 2-(dimethylamino)ethyl acrylate, and mixtures thereof and n=1 and m=1. In another preferred embodiment, the surface active agent is of the formula:

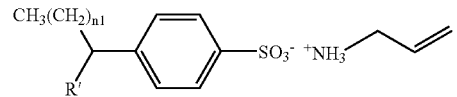

wherein n1=4–18; and wherein R' is hydrogen or saturated or unsaturated hydrocarbon group having from about 1–8 carbon atoms.

The present invention further utilizes surface active agents of the formula $$(R_1)_{n1}-\{Ar(SO_3^-M^+)_{m1}\}-O-\{Ar(SO_3^-M^+)_{m2}\}-(R_2)_{n2}$$

wherein $R_1$ and $R_2$ are independently hydrogen, or saturated or unsaturated hydrocarbon groups having from about 1–24 carbon atoms; wherein Ar is a phenyl, polyphenyl, napthyl, polynapthyl, styryl, or polystyryl group, or a mixture thereof; wherein $M^+$ is a conjugate acid of the nitrogenous base; wherein n1 and n2 are independently 0–5, provided that n1 and n2 are not both equal to zero; and wherein m1 and m2 are independently 0–8, provided that m1 and m2 are not both equal to zero. In a preferred embodiment, $R_1$ is hydrogen and $R_2$ is a saturated or unsaturated hydrocarbon group having from about 6–24 carbon atoms, Ar is phenyl, $M^+$ is a conjugate acid of the nitrogenous base, the nitrogenous base selected from the group consisting of allyl amine, diallyl amine, triallyl amine, methallyl amine, N-methyl N-allyl amine or 2-(dimethylamino)ethyl acrylate, and mixtures thereof, n1=4, n2=1, and m1 and m2 both equal one. In another preferred embodiment, $R_1$ and $R_2$ are independently saturated or unsaturated hydrocarbon groups having from about 6–24 carbon atoms, Ar is phenyl, $M^+$ is a conjugate acid of the nitrogenous base, the nitrogenous base selected from the group consisting of allyl amine, diallyl amine, triallyl amine, methallyl amine, N-methyl N-allyl amine, or 2-(dimethylamino)ethyl acrylate, and mixtures thereof, n1 and n2 both equal one, and m1 and m2 both equal one. In another preferred embodiment, the surface active agent is of the formula:

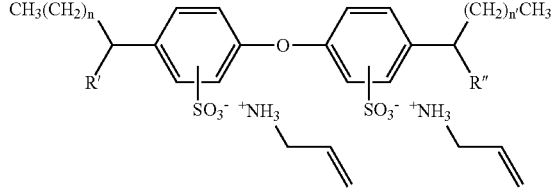

wherein n and n' are independently 4–18; and wherein R' and R" are independently hydrogen, methyl, ethyl or propyl.

The present invention further utilizes surface active agents of the formula:

$$R_1-CH(SO_3^{-M+})CO_2R_2$$

wherein $R_1$ and $R_2$ are independently saturated or unsaturated hydrocarbon groups having from about 1–24 carbon atoms; and wherein $M^+$ is a conjugate acid of the nitrogenous base. In a preferred embodiment, $R_1$ is a saturated or unsaturated hydrocarbon group having from about 6–24 carbon atoms, $R_2$ is methyl, ethyl, or propyl, or a mixture thereof, and $M^+$ is a conjugate acid of the nitrogenous base, the nitrogenous base selected from the group consisting of allyl amine, diallyl amine, triallyl amine, methallyl amine, N-methyl N-allyl amine, or 2-(dimethylamino)ethyl acrylate, and mixtures thereof. In another preferred embodiment, the surface active agent is of the formula:

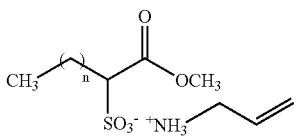

wherein n=3–18.

The present invention further utilizes surface active agents of the formula:

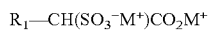

$$R_1-CH(SO_3^-M^+)CO_2M^+$$

wherein $R_1$ is a saturated or unsaturated hydrocarbon group having from about 3–24 carbon atoms; and wherein $M^+$ is a conjugate acid of the nitrogenous base. In a preferred embodiment, $R_1$ is a saturated or unsaturated hydrocarbon group having from about 6–24 carbon atoms, $M^+$ is a conjugate acid of the nitrogenous base, the nitrogenous base selected from the group consisting of allyl amine, diallyl amine, triallyl amine, methallyl amine, N-methyl N-allyl amine, or 2-(dimethylamino)ethyl acrylate, and mixtures thereof. In another preferred embodiment, the surface active agent is of the formula:

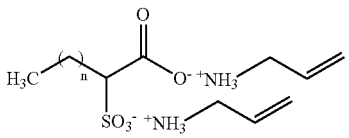

wherein n=3–18.

The present invention further utilizes surface active agents of the formula:

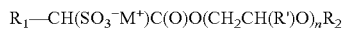

$$R_1-CH(SO_3^-M^+)C(O)O(CH_2CH(R')O)_nR_2$$

wherein $R_1$ and $R_2$ are independently saturated or unsaturated hydrocarbon groups having from about 1–24 carbon atoms; wherein R' is methyl or hydrogen; wherein n=1–100; and wherein $M^+$ is a conjugate acid of the nitrogenous base. In a preferred embodiment, $R_1$ is a saturated or unsaturated hydrocarbon group having from about 4–24 carbon atoms, R' is methyl or hydrogen, $R_2$ is methyl, ethyl, or propyl, and mixtures thereof, $M^+$ is a conjugate acid of the nitrogenous base, the nitrogenous base selected from the group consisting of allyl amine, diallyl amine, triallyl amine, methallyl amine, N-methyl N-allyl amine, or 2-(dimethylamino)ethyl acrylate, and n=1–100. In another preferred embodiment, the surface active agent is of the formula:

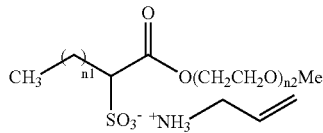

wherein n1=2–18; and wherein n2=1–20.

The present invention further utilizes surface active agents of the formula:

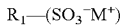

$$R_1-(SO_3^-M^+)$$

wherein $R_1$ is a saturated or unsaturated hydrocarbon group having from about 6–24 carbon atoms and wherein $M^+$ +is a conjugate acid of the nitrogenous base. In a preferred embodiment, $R_1$ is a saturated or unsatuated hydrocarbon group having from about 6–24 carbon atoms, and $M^+$ is a conjugate acid of the nitrogenous base, the nitrogenous base selected from the group consisting of allyl amine, diallyl amine, triallyl amine, methallyl amine, N-methyl N-allyl amine, or 2-(dimethylamino)ethyl acrylate, and mixtures thereof. In another preferred embodiment, the surface active agent is of the formula:

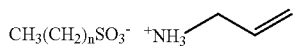

wherein n=5–17.

The present invention further utilizes surface active agents of the formula:

$$R_1CO_2(CH_2)_nCH(SO_3^-M^+)CO_2R_2$$

wherein $R_1$ and $R_2$ are independently saturated or unsaturated hydrocarbon groups having from about 1–24 carbon atoms; wherein n=0-10; and wherein $M^+$ is a conjugate acid of the nitrogenous base. In a preferred embodiment, $R_1$ and $R_2$ are independently saturated or unsaturated hydrocarbon groups having from about 1–24 carbon atoms, n=1–6, and M is a conjugate acid of the nitrogenous base, the nitrogenous base selected from the group consisting of allyl amine, diallyl amine, triallyl amine, methallyl amine, N-methyl N-allyl amine, or 2-(dimethylamino)ethyl acrylate, and mixtures thereof. In another preferred embodiment, the surface active agent is of the formula:

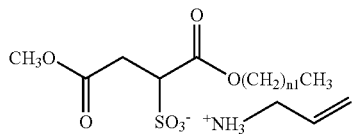

wherein n1=0–17

The present invention further utilizes surface active agents of the formula:

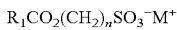

$$R_1CO_2(CH_2)_nSO_3^-M^+$$

wherein $R_1$ is a saturated or unsaturated hydrocarbon group having from about 1–24 carbon atoms; wherein n=1–10; and wherein $M^+$ is a conjugate acid of the nitrogenous base. In a preferred embodiment, $R_1$ is a saturated or unsaturated hydrocarbon group having from about 6–24 carbon atoms, n=1–5, and M⁺ is a conjugate acid of the nitrogenous base, the nitrogenous base selected from the group consisting essentially of allyl amine, diallyl amine, triallyl amine, methallyl amine, N-methyl N-allyl amine, or 2-(dimethylamino)ethyl acrylate, or a mixture thereof. In another preferred embodiment, the surface active agent is of the formula:

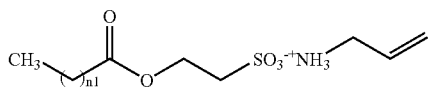

wherein n1=2–18.

The present invention further utilizes surface active agents of the formula:

wherein $R_1$ is a saturated or unsaturated hydrocarbon group having from about 1–24 carbon atoms; wherein Ar is a phenyl, polyphenyl, napthyl, polynapthyl, styryl, or polystyryl group, and mixtures thereof; wherein R' is methyl or hydrogen; wherein M⁺ is a conjugate acid of the nitrogenous base; wherein n=1–4; wherein the total number of carbon atoms represented by $(R_1)_n$ is at least 5; and wherein m=0–100. In a preferred embodiment, $R_1$ is a saturated or unsaturated hydrocarbon group having from about 6–24 carbon atoms, Ar is phenyl; M⁺ is a conjugate acid of the nitrogenous base, the nitrogenous base selected from the group consisting of allyl amine, diallyl amine, triallyl amine, methallyl amine, N-methyl N-allyl amine, or 2-(dimethylamino)ethyl acrylate, and mixtures thereof, n=1, and m=0–100. In another preferred embodiment, the surface active agent is of the formula:

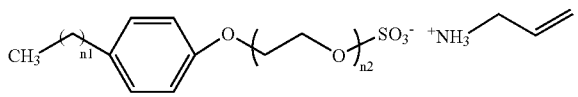

wherein n1=5–18; and wherein n2=0–20.

The present invention further utilizes surface active agents of the formula:

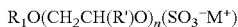

wherein $R_1$ is a saturated or unsaturated hydrocarbon group having from about 1–24 carbon atoms; wherein R' is methyl or hydrogen; wherein n=0–100; and wherein M⁺ is a conjugate acid of the nitrogenous base. In a preferred embodiment, $R_1$ is a saturated or unsaturated hydrocarbon group having from about 6–24 carbon atoms, R' is methyl or hydrogen, n=0–100, and M⁺ is a conjugate acid of the nitrogenous base, the nitrogenous base selected from the group consisting of allyl amine, diallyl amine, triallyl amine, methallyl amine, N-methyl N-allyl amine, or 2-(dimethylamino)ethyl acrylate, and mixtures thereof. In another preferred embodiment, the surface active agent is of the formula:

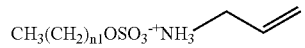

wherein n1=5–18. In another preferred embodiment, the surface active agent is of the formula:

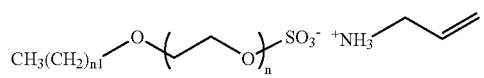

wherein n1=5–18; and wherein n=1–20.

The present invention further utilizes surface active agents of the formula:

wherein $R_1$ is a saturated or unsaturated hydrocarbon group having from about 4–24 carbon atoms; and wherein M⁺ is a conjugate acid of the nitrogenous base. In a preferred embodiment, $R_1$ is a saturated or unsaturated hydrocarbon group having from about 6–24 carbon atoms, and M⁺ is a conjugate acid of the nitrogenous base, the nitrogenous base selected from the group consisting of allyl amine, diallyl amine, triallyl amine, methallyl amine, N-methyl N-allyl amine, or 2-(dimethylamino)ethyl acrylate, and mixtures thereof. In another preferred embodiment, the surface active agent is of the formula:

wherein n=5–18.

The present invention further utilizes surface active agents of the formula:

wherein $R_1$ is a saturated or unsaturated hydrocarbon group having from about 1–24 carbon atoms; wherein R' is methyl, ethyl, propyl or hydrogen; wherein M⁺ is a conjugate acid of the nitrogenous base; and wherein n=1–10. In a preferred embodiment, M⁺ is a conjugate acid of the nitrogenous base, the nitrogenous base selected from the group consisting of allyl amine, diallyl amine, triallyl amine, methallyl amine, N-methyl N-allyl amine, or 2-(dimethylamino)ethyl acrylate, and mixtures thereof, R' is methyl, ethyl, propyl or hydrogen, and n=2–5. In another preferred embodiment, the surface active agent is of the formula:

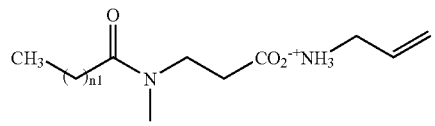

wherein n1=2–18.

The present invention further utilizes surface active agents of the formula:

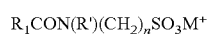

wherein $R_1$ is a saturated or unsaturated hydrocarbon group having from about 1–24 carbon atoms; wherein R' is methyl, ethyl, propyl or hydrogen; wherein $M^+$ is a conjugate acid of the nitrogenous base; and wherein n=1–10. In a preferred embodiment, $M^+$ is a conjugate acid of the nitrogenous base, the nitrogenous base selected from the group consisting of allyl amine, diallyl amine, triallyl amine, methallyl amine, N-methyl N-allyl amine, or 2-(dimethylamino)ethyl acrylate, and mixtures thereof, R' is methyl, ethyl, propyl or hydrogen, and n=2–5. In another preferred embodiment, the surface active agent is of the formula:

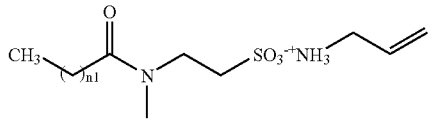

wherein n1=2–18.

The present invention further utilizes surface active agents of the formula:

$$R_1O(CH_2CH(R')O)_nCOCH_2SO_3^-M^+$$

wherein $R_1$ is a saturated or unsaturated hydrocarbon group having from about 1–24 carbon atoms; wherein R' is methyl or hydrogen; wherein n=0–100; wherein $M^+$ is a conjugate acid of the nitrogenous base. In a preferred embodiment, $R_1$ is a saturated or unsaturated hydrocarbon group having from about 6–24 carbon atoms; R' is methyl or hydrogen, $M^+$ is a conjugate acid of the nitrogenous base, the nitrogenous base selected from the group consisting of allyl amine, diallyl amine, triallyl amine, methallyl amine, N-methyl N-allyl amine, or 2-(dimethylamino)ethyl acrylate, and mixtures thereof; and n=0–100. In another preferred embodiment, the surface active agent is of the formula:

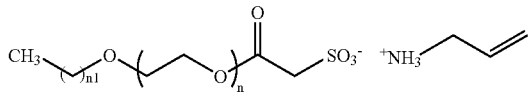

wherein n1=5–17; and wherein n=0–20.

The present invention further utilizes surface active agents of the formula:

$$R_1O(PO_3)^{x-}M^+_y$$

wherein $R_1$ is a saturated or unsaturated hydrocarbon group having from about 1–24 carbon atoms, phenyl, polyphenyl, napthyl, polynapthyl, styryl, or polystyryl group, an alky/alkoxylate substituted phenyl, an alkyl/alkoxylate substituted or poly-substituted polyphenyl, an alkyl/alkoxylate substituted or poly-substituted napthyl, an alkyl/alkoxylate substituted or poly-substituted polynapthyl, an alkyl/alkoxylate substituted or poly-substituted styryl, or an alky/alkoxylate substituted or poly-substituted polystyryl group, and mixtures thereof; wherein $M^+$ is a conjugate acid of the nitrogenous base; wherein x=1 or 2; and wherein y=1 or 2.

The present invention further utilizes surface active agents of the formula:

$$[R_1O(CH_2CH(R')O)_m]_nP(O)_p^{x-}M^+_y$$

wherein $R_1$ is a saturated or unsaturated hydrocarbon group having from about 1–24 carbon atoms; wherein R' is methyl or hydrogen; wherein $M^+$ is a conjugate acid of the nitrogenous base, the nitrogenous base selected from the group consisting of allyl amine, diallyl amine, triallyl amine, methallyl amine, N-methyl N-allyl amine, or 2-(dimethylamino)ethyl acrylate, and mixtures thereof; m=0–100; wherein n=1 or 2; wherein p=2 or 3; wherein x=1 or 2; and wherein y=1 or 2.

The present invention further utilizes surface active agents of the formula:

$$[(R_1)_nArO(CH_2CH(R')O)_m]_qP(O)_p^{x-}M^+_y$$

wherein $R_1$ is a saturated or unsaturated hydrocarbon group having from about 1–24 carbon atoms; wherein Ar is phenyl; wherein R' is methyl or hydrogen; wherein $M^+$ is a conjugate acid of the nitrogenous base, the nitrogenous base selected from the group consisting of allyl amine, diallyl amine, triallyl amine, methallyl amine, N-methyl N-allyl amine, or 2-(dimethylamino)ethyl acrylate, and mixtures thereof; wherein n=1–4; wherein m=0–100; wherein q=1 or 2; wherein p=2 or 3; wherein x=1 or 2; and wherein y=1 or 2.

The present invention further utilizes polymerizable surface active agents which are quaternary ammonium salts of the general formula:

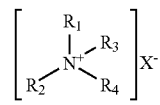

wherein $R_1$, $R_2$, $R_3$, and $R_4$ are independently, substituted or unsubstituted hydrocarbyl groups of from about 1 to about 30 carbon atoms, or hydrocarbyl groups having from about 1 to about 30 carbon atoms and containing one or more aromatic, ether, ester, amido, or amino moieties present as substituents or as linkages in the radical chain, wherein at least one of the $R_1$–$R_4$ groups contains at least one or more ethenylene groups; and wherein $X^-$ is an anion group selected from the group consisting of sulfonate, sulfate, sulfinate, sulfenate, phosphate, carboxylate, nitrate, and acetate. Additionally, useful polymerizable surface active agents include those of the above general formula in the form of ring structures formed by covalently linking two of the $R_1$–$R_4$ groups. Examples include unsaturated imidazolines, imidazoliniums, and pyridiniums, and the like. These quaternary ammonium salts may be prepared by a variety of methods known to the art, for example, halide exchange, wherein a halide based quaternary ammonium compound is ion exchanged with $X^-$, where $X^-$ is defined above.

The present invention encompasses amine oxide-derived polymerizable surface active agents, formed as shown in Scheme IX, wherein $R_1$, $R_2$, $R_3$ are independently, substituted or unsubstituted hydrocarbyl groups of from about 1 to about 30 carbon atoms, or hydrocarbyl groups having from about 1 to about 30 carbon atoms and containing one or more aromatic, ether, ester, amido, or amino moieties present as substituents or as linkages in the radical chain, wherein at least one of the $R_{1-R3}$ groups contains at least one or more ethenylene groups; and wherein $X^-$ is an anion group selected from the group consisting of sulfonate, sulfate, sulfinate, sulfenate, phosphate, carboxylate, nitrate, and acetate. Additionally, useful polymerizable surface active agents include those of the above general formula in the form of ring structures formed by covalently linking two of the $R_1$–$R_4$ groups. Examples include unsaturated imidazolines, imidazoliniums, and pyridiniums, and the like.

Scheme IX:
Amine Oxide-derived Polymerizable Surface Active Agent

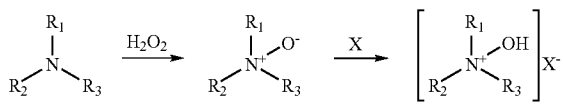

The present invention further encompasses quaternary halide-derived polymerizable surface active agents, formed as shown in Scheme X wherein $R_1$, $R_2$, $R_3$ are independently, substituted or unsubstituted hydrocarbyl groups of from about 1 to about 30 carbon atoms, or hydrocarbyl groups having from about 1 to about 30 carbon atoms and containing one or more aromatic, ether, ester, amido, or amino moieties present as substituents or as linkages in the radical chain, wherein at least one of the $R_1$–$R_3$ groups contains at least one or more ethenylene groups; and wherein $X^-$ is an anion group selected from the group consisting of sulfonate, sulfate, sulfinate, sulfenate, phosphate, carboxylate, nitrate, and acetate. Additionally, useful polymerizable surface active agents include those of the above general formula in the form of ring structures formed by covalently linking two of the $R_1$–$R_4$ groups. Examples include unsaturated imidazolines, imidazoliniums, and pyridiniums, and the like.

The present invention further encompasses polymerizable onium compounds, particularly ammonium salts, sulfonium salts, sulfoxonium salts, oxonium salts, nitronium salts, and phosphonium salts of various anions, including for example, anions group selected from the group consisting of sulfonate, sulfate, sulfinate, sulfenate, phosphate, carboxylate, nitrate, acetate and various halides; wherein the onium compound contains at least one ethenylene functionality.

"Reverse" Polymerizable Surface Active Agents

Although somewhat less preferred, the polymerizable, surface active agents utilized in the present invention may be "reverse" polymerizable surface active agents. Reverse polymerizable surface active agents utilized in the present invention are salts or quaternary nitrogen compounds comprising: (1) at least one ethylenically unsaturated acid, wherein the acid contains at least one ethylenically unsaturated moiety and is a sulfonic acid, a carboxylic acid, or a phosphoric acid, or a mixture thereof; and (2) at least one substantially saturated nitrogenous base, wherein the nitrogenous base contains at least one nitrogen atom and a $C_1$–$C_{24}$ alkyl group. By substantially saturated nitrogenous base, it is meant that the nitrogenous base contains less than about 5% unsaturation in the alkyl group(s).

In general, the ethylenically unsaturated acids of the present invention are any sulfonic acids, carboxylic acids, or phosphoric acids which contain at least one unsaturated moiety. More specifically, the ethylenically unsaturated acids useful in the present invention are generally vinyl sulfonic acids, vinyl sulfinic acids, vinyl sulfenic acids, vinyl sulfonic acid esters, vinyl carboxylic acids, vinyl, phosphoric acids, vinyl phosphonic acids, vinyl phosphinic, vinyl phosphenic acids, unsaturated sulfonic acids, unsaturated polysulfonic acids, unsaturated sulfonic acids of oils, unsaturated paraffin sulfonic acids, unsaturated lignin sulfonic acids, unsaturated petroleum sulfonic acids, unsaturated tall oil acids, unsaturated olefin sulfonic acids, unsaturated hydroxyolefin sulfonic acids, unsaturated polyolefin sulfonic acids, unsaturated polyhydroxy polyolefin sulfonic acids, unsaturated carboxylic acids, unsaturated perfluorinated carboxylic acids, unsaturated carboxylic acid sulfonates, unsaturated alkoxylated carboxylic acid sulfonic acids, unsaturated polycarboxylic acids, unsaturated polycarboxylic acid polysulfonic acids, unsaturated alkoxylated polycarboxylic acid polysulfonic acids, unsaturated phosphoric acids, unsaturated alkoxylated phosphoric acids, unsaturated polyphosphoric acids, and unsaturated alkoxylated polyphosphoric acids, unsaturated fluorinated phosphoric acids, unsaturated phosphoric acid esters of oils, unsaturated phosphinic acids, unsaturated alkylphosphinic acids, unsaturated aminophosphinic acids, unsaturated polyphosphinic acids, unsaturated vinyl phosphinic acids, unsaturated phosphonic acids, unsaturated polyphosphonic acids, unsaturated phosphonic acid alkyl esters, unsaturated α-phosphono fatty acids, unsaturated oragnoamine polymethylphosphonic acids, unsaturated organoamino dialkylene phosphonic acids, unsaturated alkanolamine phosphonic acids, unsaturated trialkyledine phosphonic acids, unsaturated acylamidomethane phosphonic acids, unsaturated alkyliminodimethylene diphosphonic acids, unsaturated polymethylene-bis(nitrilodimethylene)tetraphosphonic acids, unsaturated alkyl bis(phosphonoalkylidene) amine oxide acids, unsaturated esters of substituted aminomethylphosphonic, acids, unsaturated phosphonamidic acids, unsaturated acylated amino acids (e.g., amino acids reacted with alkyl acyl chlorides, alkyl esters or carboxylic acids to produce N-acylamino acids), unsaturated N-alkyl acylamino acids, and unsaturated acylated protein hydrolysates, and mixtures thereof.

Other ethylenically unsaturated acids which are useful in the present invention are selected from the group comprising unsaturated linear or branched alkylbenzene sulfonic acids, unsaturated alkyl sulfuric acid esters, unsaturated alkoxylated alkyl sulfuric acid esters, unsaturated α-sulfonated alkyl ester acids, unsaturated α-sulfonated ester diacids, unsaturated alkoxylated α-sulfonated alkyl ester acids, unsaturated α-sulfonated dialkyl diester acids, unsaturated di-α-sulfonated dialkyl diester acids, unsaturated α-sulfonated alkyl acetate acids, unsaturated primary and secondary alkyl sulfonic acids, unsaturated perfluorinated alkyl sulfonic acids, unsaturated sulfosuccinic mono- and diester acids, unsaturated polysulfosuccinic polyester acids, unsaturated sulfoitaconic diester acids, unsaturated sulfosuccinamic acids, unsaturated sulfosuccinic amide acids, unsaturated sulfosuccinic imide acids, unsaturated phthalic acids, unsaturated sulfophthalic acids, unsaturated sulfoisophthalic acids, unsaturated phthalamic acids, unsaturated sulfophthalamic acids, unsaturated alkyl ketone sulfonic acids, unsaturated hydroxyalkane-1-sulfonic acids, unsaturated lactone sulfonic acids, unsaturated sulfonic acid amides, unsaturated sulfonic acid diamides, unsaturated alkyl phenol sulfuric acid esters, unsaturated alkoxylated alkyl phenol sulfuric acid esters, unsaturated alkylated cycloalkyl sulfuric acid esters, unsaturated alkoxylated alkylated cycloalkyl sulfuric acid esters, unsaturated dendritic polysulfonic acids, unsaturated dendritic polycarboxylic acids, unsaturated dendritic polyphosphoric acids, unsaturated sarcosinic acids, unsaturated isethionic acids, and unsaturated tauric acids, and mixtures thereof.

Additionally in accordance with the present invention, suitable ethylenically unsaturated acids of the present invention include unsaturated fluorinated carboxylic acids, unsaturated fluorinated sulfonic acids, unsaturated fluorinated sulfate acids, unsaturated fluorinated phosphonic and phosphinic acids, and mixtures thereof.

In general, the substantially saturated nitrogenous bases of the present invention are any bases which contain at least one nitrogen atom, and are capable of forming a salt with the ethylenically unsaturated acid. The saturated nitrogenous bases suitable for use in the present invention include any primary, secondary or tertiary amine, which has at least one $C_1$–$C_{24}$ alkyl group. Preferably, the alkyl groups of such amines have from about 12 to about 22 carbon atoms, and may be substituted or unsubstituted. Such amines, include for example, stearamido propyl dimethyl amine, diethyl amino ethyl stearamide, dimethyl stearamine, dimethyl soyamine, soyamine, myristyl amine, tridecyl amine, ethyl stearylamine, N-tallowpropane diamine, ethoxylated (5 moles E.O.) stearylamine, dihydroxy ethyl stearylamine, and arachidylbehenylamine and mixtures thereof.

Auxiliary Polymerizable Surface Active Agents

The present invention encompasses the use of auxiliary polymerizable surface active agents, i.e. polymerizable surface active agent known to those skilled in the art, in combination with the polymerizable surface active agents, homopolymeric surface active agents, and supplemental surface active agents described herein. Examples of auxiliary polymerizable surface active agents useful in the present invention are shown below in Table I.

TABLE I

| Auxiliary Polymerizable Surface Active Agents | |
|---|---|
| Diallyl Amine Pluronics - BASF | 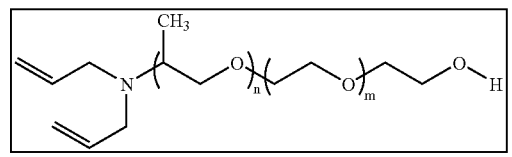 |
| Linoleic Alcohol Derivatives - ICI | 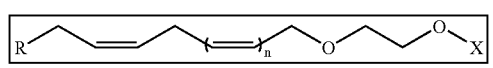 |
| Allyl Alkyl Phenol Derivatives - DKS (Japan) | 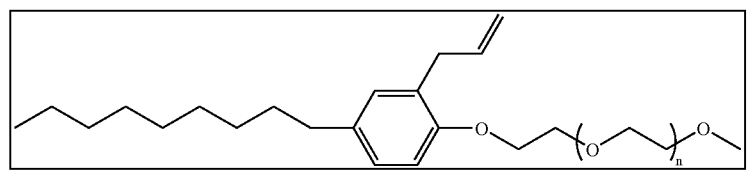 |
| Acrylate Derivatives - PPG | 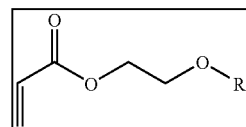 |
| Allyl Alcohol Alkenyl Succinic Anhydride Derivatives - KAO (Japan) | 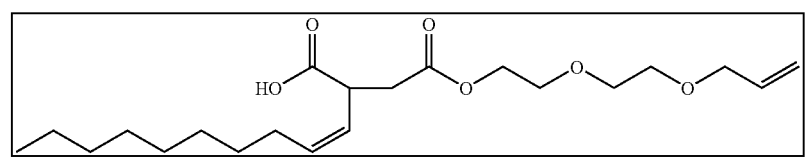 |
| Polystep RA Series (Maleic Derivatives) - Stepan Co. | 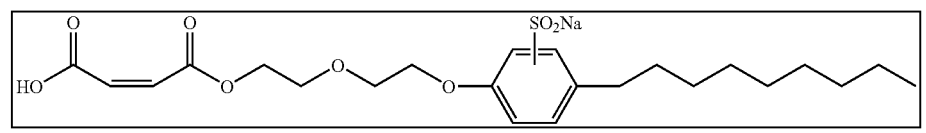 |
| Maleic Derivatives - Rhone Poulenc | 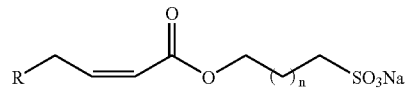 |
| Trem LF-40 Allyl Sulfosuccinate Derivatves - Henkel | 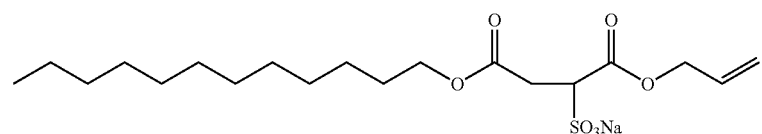 |

Additional auxiliary polymerizable surfactants useful herein, for example, are generally disclosed in *Polymerizable Surfactants* Guyot, A. *Current Opinions in Colloid and Surface Science*, 1996, pg. 580–585; Reactive Surfactants in Emulsion Polymerization Guyot, A.; et. al; Advances in Polymer Science, Vol. 11, Springer-Verlag, Berlin, 1994, pg.43–65; and Polymerizable Surfactant Holmber, K. Progress in Organic Coatings, 20 (1992) 325–337 (all incorporated herein in their entirety).

Supplemental Surface Active Agents

Generally, it is advantageous to not use conventional, non-polymerizable surface active agents in the present invention. However, if so desired, the polymerizable surface active agents of the present invention may be used in the polymerization in combination with minor amounts of a conventional polymerization surfactants, i.e. supplemental surface active agents, that are not polymerizable. Without being bound by any particular theory, these supplemental surface active agents may allow for the varying of particle size of the resulting discrete, solid, polymeric particles. The supplemental surface active agents are generally anionic, nonionic, cationic or amphoteric surfactants or mixtures thereof, and are typically used as in a concentration of about 0.01 to about 20.0 percent by weight, based on the total weight of surface active agents (i.e. both polymerizable and non-polymerizable). Somewhat more preferably, the supplemental surface active agents are used in a concentration of about 0.01 to about 5.0 percent by weight, based on the total weight of supplemental surface active agents (i.e. both polymerizable and non-polymerizable).

Suitable supplemental nonionic surface active agents are generally disclosed in U.S. Pat. No. 3,929,678, Laughlin et al., issued Dec. 30, 1975, at column, 13 line 14 through column 16, line 6, incorporated herein by reference. Generally, the supplemental nonionic surface active agent is selected from the group comprising polyoxyethylenated alkylphenols, polyoxyethyleneated straight chain alcohols, polyoxyethyleneated branched chain alcohols, polyoxyethyleneated polyoxypropylene glycols, polyoxyethyleneated mercaptans, fatty acid esters, glyceryl fatty acid esters, polyglyceryl fatty acid esters, propylene glycol esters, sorbitol esters, polyoxyethyleneated sorbitol esters, polyoxyethylene glycol esters, polyoxyethyleneated fatty acid esters, primary alkanolamides, ethoxylated primary alkanolamides, secondary alkanolamides, ethoxylated secondary alkanolamides, tertiary acetylenic glycols, polyoxyethyleneated silicones, N-alkylpyrrolidones, alkylpolyglycosides, alkylpolylsaccharides, EO-PO block polymers, polyhydroxy fatty acid amides, amine oxides and mixtures thereof. Further, exemplary, non-limiting classes of useful supplemental nonionic surface active agents are listed below:

1. The polyethylene, polypropylene, and polybutylene oxide condensates of alkyl phenols. In general, the polyethylene oxide condensates are preferred. These compounds include the condensation products of alkyl phenols having an alkyl group containing from about 6 to 12 carbon atoms in either a straight or branched chain configuration with the alkylene oxide. In a preferred embodiment, the ethylene oxide is present in an amount equal to from about 1 to about 25 moles of ethylene oxide per mole of alkyl phenol. Commercially available nonionic surfactants of this type include Igepal® CO-630, marketed by Stepan Company, Canada; and Triton®D X-45, X-114, X-100 and X-102, all marketed by the Union Carbide Company.

2. The condensation products of aliphatic alcohols with from about 1 to about 25 moles of ethylene oxide. The alkyl chain of the aliphatic alcohol can either be straight or branched, primary or secondary, and generally contain from about 8 to about 22 carbon atoms. Particularly preferred are the condensation products of alcohols having an alkyl group containing from about 6 to about 11 carbon atoms with from about 2 to about 10 moles of ethylene oxide per mole of alcohol. Examples of commercially available nonionic surfactants of this type include Tergitol® 15-S-9 (the condensation products of $C_{11}$–$C_{15}$ linear alcohol with 9 moles of ethylene oxide), Tergitol® 24-L-6 NMW (the condensation products of $C_{12}$–$C_{14}$ primary alcohol with 6 moles of ethylene oxide with a narrow molecular weight distribution), both marketed by Union Carbide Corporation; Neodol® 91-8 (the condensation product of $C_9$–$C_{11}$ linear alcohol with 8 moles of ethylene oxide), Neodol® 23-6.5 (the condensation product of $C_{12}$–$C_{13}$ linear alcohol with 6.5 moles of ethylene oxide), Neodol® 45-7 (the condensation product of $C_{14}$–$C_{15}$ linear alcohol with 7 moles of ethylene oxide), Neodol® 91-6 (the condensation product of $C_9$–$C_{11}$ linear alcohol with 6 moles of ethylene oxide), marketed by Shell Chemical Company, and Kyro® EOB (the condensation product of $C_{13}$–$C_{15}$ linear alcohol with 9 moles of ethylene oxide), marketed by the Procter and Gamble Company.

3. The condensation products of ethylene oxide with a hydrophobic base formed by the condensation of propylene oxide with propylene glycol. The hydrophobic portion of these compounds preferably has a molecular weight of from about 1500 to about 1880 and exhibits water insolubility. The addition of polyoxyethylene moieties to this hydrophobic portion tends to increase the water solubility of the molecule as a whole, and the liquid character of the product is retained up to the point where the polyoxyethylene content is about 50% of the total weight of the condensation product, which corresponds to condensation with up to about 40 moles of ethylene oxide. Examples of compounds of this type include certain of the commercially available Pluronic® surfactants, marketed by BASF.

4. The condensation products of ethylene oxide with the product resulting from the reaction of propylene oxide and ethylenediamine. The hydrophobic moiety of these products consists of the reaction product of ethylenediamine and excess propylene oxide, and generally has a molecular weight of from about 2500 to about 3000. This hydrophobic moiety is condensed with ethylene oxide to the extent that the condensation product contains from about 40% to about 80% by weight of polyoxyethylene and has a molecular weight of from about 5,000 to about 11,000. Examples of this type of nonionic surfactant include certain of the commercially available Tetronic® compounds, marketed by BASF.

5. Semi-polar nonionic surfactants are a special category of supplemental nonionic surface active agents which include water-soluble amine oxides containing on alkyl moiety of from about 10 to about 18 carbon atoms and 2 moieties selected from the group comprising alkyl groups and hydroxyalkyl groups containing from about 1 to about 3 carbon atoms; and water-soluble sulfoxides containing alkyl moieties of from about 10 to about 18 carbon atoms and a moiety selected from the group comprising alkyl groups and hydroxyalkyl groups of from about 1 to about 3 carbon atoms.

6. Alkylpolysaccharides disclosed in U.S. Pat. No. 4,565,647, Lenado, issued Jan. 21, 1986, incorporated herein by reference, having a hydrophobic group containing from about 6 to about 30 carbon atoms, preferably from about 10 to about 16 carbon atoms and a polysaccharide, e.g., a polyglucoside, hydrophilic group containing from about 1.3 to about 10, preferably from about 1.3 to about 3, most preferably from about 1.3 to about 2.7 saccharide units. Any reducing saccharide containing 5 or 6 carbon atoms can be used, e.g., glucose, galactose and galactosyl moieties can be substituted for the glucosyl moieties. (Optionally, the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units.

7. An ethyl ester ethoxylate and/or alkoxylate such as those described in U.S. Pat. No. 5,220,046, incorporated herein by reference. These material may be prepared according to the procedure set forth in Japanese Kokai patent application No. HEI 5 [1993]-222396. For example, they may be prepared by a one-step condensation reaction between an alkyl ester and an alkylene oxide in the present of a catalytic amount of magnesium together with another ion selected from the group of $Al^{+3}$, $Ga^{-3}$, $In^{-3}$, $Co^{-3}$, $Sc^{-3}$, $La^{-3}$ and $Mn^{-3}$. Optionally, and less desirably, there can be a polyalkyleneoxide chain joining the hydrophobic moiety and the polysaccharide moiety. The preferred alkyleneoxide is ethylene oxide. Typical hydrophobic groups include alkyl groups, either saturated or unsaturated, branched or unbranched, containing from about 8 to about 18, preferably from about 12 to about 14 carbon atoms; n is 2 or 3, preferably 2; t is from about 0 to about 10, preferably 0; and x is from about 1.3 to about 10, preferably from about 1.3 to 3, most preferably from about 1.3 to about 2.7. The glycosyl is preferably derived from glucose. To prepare these compounds, the alcohol or alkylpolyethoxy alcohol is formed first and then reacted with glucose, or a source of glucose, to form the glucoside (attachment at the 1–position). The additional glucosyl units can then be attached between their 1–position and the preceding glycosyl units 2-, 3-, 4, and/or 6–position, preferably predominately the 2–position.

Examples of suitable supplemental amphoteric surface active agents are selected from the group comprising alkyl glycinates, propionates, imidazolines, amphoalkylsulfonates sold as "Miranol"® by Rhone Poulenc, N-alkylaminopropionic acids, N-alkyliminodipropionic acids, imidazoline carboxylates, N-alkylbetaines, amido propyl betaines, sarcosinates, cocoamphocarboxyglycinates, amine oxides, sulfobetaines, sultaines and mixtures thereof. Additional suitable amphoteric surfactants include cocoamphoglycinate, cocoamphocarboxyglycinate, lauramphocarboxyglycinate, cocoamphopropionate, lauramphopropionate, stearamphoglycinate, cocoamphocarboxy-propionate, tallowamphopropionate, tallowamphoglycinate, oleoamphoglycinate, caproamphoglycinate, caprylamphopropionate, caprylamphocarboxyglycinate, cocoyl imidazoline, lauryl imidazoline, stearyl imidazoline, behenyl imidazoline, behenylhydroxyethyl imidazoline, caprylamphopropylsulfonate, cocamphopropylsulfonate, stearamphopropyl-sulfonate, oleoamphopropylsulfonate and the like.

Examples of supplemental amine oxide surface active agents which are generally suitable for use in the present invention are alkylamine and amidoamine oxides. Examples of supplemental betaine and sultaine surface active agents which are suitable for use in the present invention are alkyl betaines and sultaines sold as "Mirataine"® by Rhone Poulenc, "Lonzaine"® by Lonza, Inc., Fairlawn, N.J. Examples of supplemental betaines and sultaines are cocobetaine, cocoamidoethyl betaine, cocoamidopropyl betaine, lauryl betaine, lauramidopropyl betaine, palmamidopropyl betaine, stearamidopropyl betaine, stearyl betaine, cocosultaine, lauryl sultaine, tallowamidopropyl hydroxysultaine and the like.

Examples of supplemental cationic surface active agents useful in the present invention are fatty amine salts, fatty diamine salts, polyamine salts, quaternary ammonium compounds, polyoxyethyleneated fatty amines, quaternized polyoxyethyleneated fatty amines, amine oxides and mixtures thereof.

Examples of suitable supplemental cationic surface active agents are disclosed in the following documents, all incorporated by reference herein: M. C. Publishing Co., *McCutcheon's Detergents & Emulsifiers*, (North American Ed., 1993); Schwartz et al., *Surface Active Agents, Their Chemistry and Technology*, New York; Interscience Publisher, 1949; U.S. Pat. No. 3,155,591, Hilfer, issued Nov. 3, 1964; U.S. Pat. No. 3,929,678, Laughlin et al., issued Dec. 30, 1975; U.S. Pat. No. 3,959,461, Bailey et al., issued May 25, 1976; and U.S. Pat. No. 4,387,090, Bolich, Jr., issued Jun. 7, 1983.

Examples of supplemental cationic surface active agents in the form of quaternary ammonium salts include dialkyldiethyl ammonium chlorides and trialkyl methyl ammonium chlorides, wherein the alkyl groups have from about 12 to about 22 carbon atoms and are derived from long-chain fatty acids, such as hydrogenated tallow fatty acid (tallow fatty acids yield quaternary compounds wherein $R_1$ and $R_2$ have predominately from about 16 to about 18 carbon atoms). Examples of supplemental quaternary ammonium salts useful herein include ditallowdimethyl ammonium chloride, ditallowdimethyl ammonium methyl sulfate, dihexadecyl dimethyl ammonium chloride, di-(hydrogenated tallow) dimethyl ammonium chloride, dioctadecyl dimethyl ammonium chloride, dieicosyl dimethyl ammonium chloride, didocosyl dimethyl ammonium chloride, di-(hydrogenated tallow) dimethyl ammonium acetate, dihexadecyl dimethyl ammonium chloride, dihexadecyl dimethyol ammonium acetate, ditallow dipropyl ammonium phosphate, ditallow dimethyl ammonium nitrate, di-(coconutalkyl) dimethyl ammonium chloride, and stearyl dimethyl benzyl ammonium chloride.

Salts of primary, secondary and tertiary fatty amines are also suitable supplemental cationic surface active agents. The alkyl groups of such supplemental amines preferably have from about 12 to about 22 carbon atoms, and may be substituted or unsubstituted. Such amines, useful herein, include stearamido propyl dimethyl amine, diethyl amino ethyl stearamide, dimethyl stearamine, dimethyl soyamine, soyamine, myristyl amine, tridecyl amine, ethyl stearylamine, N-tallowpropane diamine, ethoxylated (5 moles E.O.) stearylamine, dihydroxy ethyl stearylamine, and arachidylbehenylamine. Suitable supplemental amine salts include the halogen, acetate, phosphate, nitrate, citrate, lactate and alkyl sulfate salts. Such supplemental salts include stearylamine hydrogen chloride, soyamine chloride, stearylamine formate, N-tallowpropane diamine dichloride and stearamidopropyl dimethylamine citrate. Supplemental cationic amine surfactants included among those useful in the present invention are also disclosed in U.S. Pat. No. 4,275,055, Nachtigal, et al., issued Jun. 23, 1981, incorporated herein by reference.

Supplemental cationic surface active agents which are especially useful are quaternary ammonium or amino compounds having at least one N-radical containing one or more nonionic hydrophilic moieties selected from the group comprising alkoxy, polyoxyalkylene, alkylamido, hydroxyalkyl, and alkylester moieties, and combinations thereof. The compounds contain at least one hydrophilic moiety within 4, preferably within 3, carbon atoms (inclusive) of the quaternary nitrogen or cationic amino nitrogen. Additionally, carbon atoms that are part of a hydrophilic moiety, e.g., carbon atoms in a hydrophilic polyoxyalkylene (e.g., —$CH_2$—$CH_2$—O—), that are adjacent to other hydrophilic moieties are not counted when determining the number of hydrophilic moieties within 4, or preferably 3, carbon atoms of the cationic nitrogen. In general, the alkyl portion of any hydrophilic moiety is preferably a $C_1$–$C_3$ alkyl. Suitable hydrophile-containing radicals include, for example, ethoxy, propoxy, polyoxyethylene, polyoxypropylene, ethylamido, propylamido, hydroxymethyl, hydroxyethyl, hydroxypropyl, methyl ester, ethyl ester, propyl ester, or mixtures thereof, as nonionic hydrophile moieties.

Among the supplemental cationic surface active agents useful herein are those of the general formula:

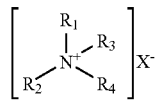

wherein $R_1$, $R_2$, $R_3$, and $R_4$ comprise, independently, substituted or unsubstituted substantially saturated hydrocarbyl chains of from about 1 to about 30 carbon atoms, or a hydrocarbyl having from about 1 to about 30 carbon atoms and containing one or more aromatic, ether, ester, amido, or amino moieties present as substituents or as linkages in the radical chain, wherein at least on of the $R_1$–$R_4$ groups contains one or more hydrophilic moieties selected from the group comprising alkoxy (preferably $C_1$–$C_3$ alkoxy), polyoxyalkylene (preferably $C_1$–$C_3$ polyoxyalkylene), alkylamido, hydroxyalkyl, alkylester and combination thereof. Preferably, the cationic conditioning surfactant contains from about 2 to about 10 nonionic hydrophile moieties located within the about stated ranges. For purposes herein, each hydrophilic amido, alkoxy, hydroxyalkyl, alkylester, alkylamido or other unit is considered to be a distinct nonionic hydrophile moiety. $X^-$ is a substantially saturated soluble salt forming anion preferably selected from the group comprising halogens (especially chlorine), acetate, phosphate, nitrate, sulfonate, and alkyl sulfate radicals.

Preferred supplemental cationic surface active agents include polyoxyethylene (2) stearyl methyl ammonium chloride, methyl bis-(hydrogenated tallowamidoethyl) 2-hydroxyethyl ammonium methyl sulfate, polyoxypropylene (9) diethyl methyl ammonium chloride, tripolyoxyethylene (total PEG-10) stearyl ammonium phosphate, bis-(N-hydroxyethyl-2-oleyl imidazolinium chloride) polyethylene glycol (1), and isododecylbenzyl triethanolammonium chloride.

Other supplemental ammonium quaternary and amino surface active agents include those of the above general formula in the form of ring structures formed by covalently linking two of the radicals. Examples include imidazolines, imidazoliniums, and pyridiniums, etc., wherein said compound has at least one nonionic hydrophile-containing radical as set forth above. Specific examples include 2-heptadecyl-4,5-dihydro-1H-imidazol-1-ethanol, 4,5-dihydro-1-(2-hydroxyethyl)-2-isoheptadecyl-1-phenylmethylimidazolium chloride, and 1-[2-oxo-2-[[2-[(1-oxoctadecyl)oxy]ethyl]amino]ethyl] pyridinium chloride.

Salts of primary, secondary and tertiary fatty amines are also preferred supplemental cationic surfactant materials. The alkyl groups of such amines preferably have from about 1 to about 30 carbon atoms and must contain at least one, preferably about 2 to about 10, nonionic hydrophilic moieties selected from the group comprising alkoxy, polyoxyalkylene, alkylamido, hydroxyalkyl, and alkylester groups, and mixtures thereof.

The supplemental anionic surface active agents suitable for use in the present invention are generally the sodium, potassium, calcium, ammonium or alkanolamine salts of any substantially saturated sulfonic acid, carboxylic acid, or phosphoric acid, or a mixture thereof. More specifically, supplemental anionic surface active agents suitable for use in the present invention are generally the sodium, potassium, calcium, ammonium or alkanolamine salts of saturated sulfonic acids, sulfinic acids, sulfenic acids, sulfonic acid esters, carboxylic acids, phosphonic acids, phosphinic, phosphenic acids, polysulfonic acids, sulfonic acids of oils, paraffin sulfonic acids, lignin sulfonic acids, petroleum sulfonic acids, tall oil acids, olefin sulfonic acids, hydroxyolefin sulfonic acids, polyolefin sulfonic acids, polyhydroxy polyolefin sulfonic acids, carboxylic acids, perfluorinated carboxylic acids, carboxylic acid sulfonates, alkoxylated carboxylic acid sulfonic acids, polycarboxylic acids, polycarboxylic acid polysulfonic acids, alkoxylated polycarboxylic acid polysulfonic acids, phosphoric acids, alkoxylated phosphoric acids, polyphosphoric acids, and alkoxylated polyphosphoric acids, fluorinated phosphoric acids, phosphoric acid esters of oils, phosphinic acids, alkylphosphinic acids, aminophosphinic acids, polyphosphinic acids, vinyl phosphinic acids, phosphonic acids, polyphosphonic acids, phosphonic acid alkyl esters, α-phosphono fatty acids, oragnoamine polymethylphosphonic acids, organoamino dialkylene phosphonic acids, alkanolamine phosphonic acids, trialkyledine phosphonic acids, acylamidomethane phosphonic acids, alkyliminodimethylene diphosphonic acids, polymethylene-bis(nitrilodimethylene)tetraphosphonic acids, alkyl bis(phosphonoalkylidene) amine oxide acids, esters of substituted aminomethylphosphonic acids, phosphonamidic acids, acylated amino acids (e.g., amino acids reacted with alkyl acyl chlorides, alkyl esters or carboxylic acids to produce N-acylamino acids), N-alkyl acylamino acids, and acylated protein hydrolysates, and mixtures thereof.

Other supplemental anionic surface active agents suitable for use in the present invention are the sodium, potassium, calcium, ammonium or alkanolamine salts of saturated linear or branched alkylbenzene sulfonic acids, alkyl sulfuric acid esters, alkoxylated alkyl sulfuric acid esters, α-sulfonated alkyl ester acids, α-sulfonated ester diacids, alkoxylated α-sulfonated alkyl ester acids, α-sulfonated dialkyl diester acids, di-α-sulfonated dialkyl diester acids, α-sulfonated alkyl acetate acids, primary and secondary alkyl sulfonic acids, perfluorinated alkyl sulfonic acids, sulfosuccinic mono- and diester acids, polysulfosuccinic polyester acids, sulfoitaconic diester acids, sulfosuccinamic acids, sulfosuccinic amide acids, sulfosuccinic imide acids, phthalic acids, sulfophthalic acids, sulfoisophthalic acids, phthalamic acids, sulfophthalamic acids, alkyl ketone sulfonic acids, hydroxyalkane-1-sulfonic acids, lactone sulfonic acids, sulfonic acid amides, sulfonic acid diamides, alkyl phenol sulfuric acid esters, alkoxylated alkyl phenol sulfuric acid esters, alkylated cycloalkyl sulfuric acid esters, alkoxylated alkylated cycloalkyl sulfuric acid esters, dendritic polysulfonic acids, dendritic polycarboxylic acids, dendritic polyphosphoric acids, sarcosinic acids, isethionic acids, and tauric acids, and mixtures thereof.

Additionally in accordance with the present invention, supplemental anionic surface active agents suitable for use in the present invention are generally the sodium, potassium, calcium, ammonium or alkanolamine salts of saturated fluorinated carboxylic acids, fluorinated sulfonic acids, fluorinated sulfate acids, fluorinated phosphonic and phosphinic acids, and mixtures thereof.

In a preferred embodiment of the present invention, the polymerization process is conducted in the absence of any non-polymerizable, supplemental surfactant, as the polymerizable surface active agents of the present invention display excellent capacity for producing emulsion stability characteristics in an emulsion polymerization.

In another embodiment of the present invention, the polymerizable surface active agents of the present invention may be used as co-monomers with the ethylenically unsaturated monomer(s) to modify the physical properties of the resulting polymer. In this embodiment, supplemental surface active agents also may be used as additives to the polymerization, e.g., in amounts of from about 3 to 6 weight percent, based on the total weight of monomer. Although somewhat less preferred, in a further embodiment of the present invention, any conventional organic solvent, which may be a solvent for both the monomer(s) and/or polymer, or just the monomer(s) may be used.

Initiators and Additives

Organic or inorganic initiators may be used to initiate the polymerization reaction. A sufficient quantity of a polymerization initiator (such as a conventional free radical initiator) is typically introduced into the polymerization medium to cause polymerization of the monomer(s) at the particular temperatures employed. Initiators used in polymerization processes may be of the type which produce free radicals and conveniently are peroxygen compounds, for example: inorganic peroxides such as hydrogen peroxide and inorganic persulfate compounds such as ammonium persulfate, sodium persulfate and potassium per-sulfate; organic hydroperoxides such as cumene hydroperoxide and tertiary butyl hydroperoxide; organic peroxides such as benzoyl peroxide, acetyl peroxide, lauroyl peroxide, peroxydicarbonate esters such as diisopropyl peroxydicarbonate, peracetic acid and per-benzoic acid, sometimes activated by water-soluble reducing agents such as ferrous compounds, sodium bisulfite or hydroxylamine hydrochloride, and other free radical producing materials such as 2,2'-azobisisobutyronitrile.

A further additive which may be added to the mixture contents is a conventional chain transfer agent, such as an alkyl polyhalide or mercaptan. Examples of suitable chain transfer agents include bromoform, carbon tetrachloride, carbontetrabromide, bromoethane, $C_1$–$C_{12}$ alkyl mercaptans, e.g., dodecylmercaptan, thiophenol, and hydroxyalkyl mercaptans, e.g., mercaptoethanol.

All documents, e.g., patents and journal articles, cited above or below are hereby incorporated by reference in their entirety.

In the following examples, all amounts are stated in percent by weight unless indicated otherwise.

One skilled in the art will recognize that modifications may be made in the present invention without deviating from the spirit or scope of the invention. The invention is illustrated further by the following examples which are not to be construed as limiting the invention or scope of the specific procedures or compositions described herein. All documents, e.g., patents and journal articles, cited above or below are hereby incorporated by reference in their entirety.

As used in the Examples appearing below, the following designations, symbols, terms and abbreviations have the indicated meanings:

| Material | Definition |
|---|---|
| Polystep ® A-13 | Linear dodecylbenzene sulfonic acid (commercially available from Stepan Company, Northfield Illinois) |
| Polystep ® A-16 | Branched dodecylbenzene sulfonic acid, sodium salt (commercially available from Stepan Company, Northfield Illinois) |
| Polystep ® A-17 | Branched dodecylbenzene sulfonic acid (commercially available from Stepan Company, Northfield Illinois) |
| Cedephos CP-610 | Nonyl Phenol 9-EO Phosphoric Acid Ester (commercially available from Stepan Company, Northfield Illinois) |

The amount of agglomerated polymers, or "coagulum", in the resulting lattices at the conclusion of the polymerization is determined by collecting the agglomerated polymers using a 20 mesh screen that has openings sufficiently large enough to allow the discrete un-agglomerated polymers to pass, rinsing the collected agglomerated polymers with water, and weighting the remaining agglomerated polymers trapped on the screen. The percent coagulum is calculated by dividing the weight of the coagulum by the theoretical weight of the entire latex based upon the weights of the ingredients used for the polymerization reaction.

The viscosity of the resulting lattices following polymerization is determined by using a RV Brookfield synchrolechtric viscometer equipped with a No. 3 spindle. During such determinations 950 ml of each latex is placed in a 1000 ml beaker and the viscometer operated at 25° C. and 60 rpm.

The mechanical stability of the lattices following exposure to mechanical stress is evaluated to determine the extent to which there is a change in the viscosity and/or the visual presence of coagulum. More specifically, two cups of each latex are placed in a five-cup stainless steel Hamilton Beach blender, and the blender operated at medium speed until the latex coagulates. Failure of the latex is the point at which coagulum separation can be visually observed; a longer time of blending at medium speed without coagulum separation, i.e. a longer time before failure, is a highly desirable characteristic of a latex.

Solids of lattices were determined by concentrating the latex at 120° C. in an oven to remove all volitiles, and subsequently weighing the residue. The pH of each solution was measured using an Orion 210 pH meter. Particle size was measured using a Nicomp 370, [submicron analyzer, (up to 2 microns)].

The particle size of the resulting lattices is determined with a NICOMP 370C Auto-dilution particle size analyzer using standard methods and procedures for operation of such equipment and such data recorded for 50% volume in units of nano-meters.

The water sensitivity, e.g. hydrophobicity, of the resulting lattices was determined by ASTM D724-45.

All $^1$H NMR spectra were recorded using a 270 MHz Joel Delta NMR Fourier Transform Spectrometer. Chemical shifts (δ) are reported in parts per million (ppm) down field from tetramethylsilane (TMS) using internal TMS or residual non-deuterated solvent as a reference. NMR data for all samples was acquired by dissolving the solid sample in CD$_3$OD.

The allylamine and propyl amine may be obtained from Aldrich Chemical Company (USA).

In the following examples, all amounts are stated in percent by weight of active material unless indicated otherwise. One skilled in the art will recognize that modifications may be made in the present invention without deviating from the spirit or scope of the invention. The invention is illustrated further by the following examples which are not to be construed as limiting the invention or scope of the specific procedures or compositions described herein.

EXAMPLE 1

A methylmethacrylate/butylacrylate/methacrylic acid (MMA/BA/MMA) co-polymer (in a weight ratio of about 48:49:3), in combination with the allylamine salt of dodecylbenzenesulfonic acid (ADDBS), is prepared as follows. About 254 g of deionized water and about 10.6 g of ADDBS (as a 22% active aqueous solution), are placed in a reactor suitable for emulsion polymerization, equipped with agitation means, heating means and cooling means. With agitation, the reactor is purged with nitrogen (99% pure), and heated to about 80–82° C. The temperature of the reactor contents is adjusted to about 77–79° C., and about 75 g of the monomer mixture (20% of a total of 374 g of the MMA/BA/MMA monomer mixture in the ratio above) is added to the reactor. After 10 minutes, 16.9 g of a solution of ammonium persulfate (20% of the total solution of 1.9 g of ammonium persulfate dissolved in 82.5 g of water) is added to the reactor over a period of about 7 minutes with continued agitation, during which time there is an exotherm of about 7–10° C. After the exotherm is complete, about 299 g of the monomer mixture (the remaining 80% MMA/BA/MMA monomer mixture), 64.5 g of the ammonium persulfate solution (the remaining 80%), and 15.55 g of ADDBS (as the 22% active aqueous solution) are simultaneously charged to the reactor over a period of 2 hours with continued agitation, while keeping the reactor contents at a temperature of about 78–81° C. The reactor temperature is then elevated to about 82–84° C. with continued agitation, for about 15 minutes. After this 15 minute period, the reactor is cooled to about 30° C. The resulting latex product is completely removed from the reactor and gravity filtered using a first 20 mesh screen and then a second 250 mesh screen. The total latex coagulum (i.e. solids) from both mesh screens is collected, combined and weighed. Various physiochemical properties of the latex are reported in Table II.

FIG. I depicts the partial $^1$H NMR spectrum, showing the region of δ 5.0–8.0, of the allylamine salt of dodecylbenzenesulfonic acid (ADDBS). The peaks centered around 7.4 ppm are signals corresponding to the aromatic protons of the benzene ring. The signals at about 5.9 ppm and 5.3 ppm correspond to the protons of the double bond in the allyl amine portion of the compound.

FIG. II depicts the partial $^1$H NMR spectrum, showing the region of δ 5.0–8.0, of a latex formulation prepared according to Example #1 above. As can be seen in FIG. II, the double bond signals from he allyl amine portion of the compound, at 5.9 ppm and 5.3 ppm, are absent from the spectrum. Without being bound by any particular theory, the double bond has been substantially completely consumed during the polymerization reaction.

EXAMPLE 2

COMPARATIVE EXAMPLE

A methylmethacrylate/butylacrylate/methacrylic acid (MMA/BA/MMA) co-polymer (in a weight ratio of about 48:49:3), in combination with the propylamine salt of dodecylbenzenesulfonic acid (PDDBS), is prepared as follows. About 330 g of deionized water and about 25 g of PDDBS (as a 20% active aqueous solution) are placed in a reactor suitable for emulsion polymerization, equipped with agitation means, heating means and cooling means. With agitation, the reactor is purged with nitrogen (99% pure), and heated to about 80–82° C. The temperature of the reactor contents is adjusted to about 77–79° C., and about 75 g of the monomer mixture (20% of a total of 374 g of the MMA/BA/MMA monomer mixture in the ratio above) is added to the reactor. After 10 minutes, 15.5 g of a solution of ammonium persulfate (20% of the total solution of 1.9 g of ammonium persulfate dissolved in 75.6 g of water), is added to the reactor over a period of about 5 minutes with continued agitation, during which time there is an exotherm of about 3–5° C. After the exotherm is complete, about 299 g of the monomer mixture (the remaining 80%) and 62 g of the ammonium persulfate solution (the remaining 80%) are simultaneously charged tot he reactor over a period of 2 hours with continued agitation, while keeping the reactor contents at a temperature of about 78–82° C. The reactor temperature is then elevated to about 82–84° C. with continued agitation, for about 15 minutes. After this 15 minute period, the reactor is cooled to about 30° C. The resulting latex product is completely removed from the reactor and gravity filtered using a first 20 mesh screen and then a second 250 mesh screen. The total latex coagulum (i.e. solids) from both mesh screens is collected, combined and weighed. Various physiochemical properties of the latex are reported in Table II.

EXAMPLE 3

A methylmethacrylate/butylacrylate/methacrylic acid (MA/BA/MMA) co-polymer (in a weight ratio of about 46.1:50.8:3.1) in combination with the allylamine salt of nonyl phenol 9-EO phosphate acid ester (Cedephos CP-610) is prepared as follows. About 249 g of deionized water and about 11.0 g of the allyl amine salt of Cedephos CP-610 (as a 20% active aqueous solution), are placed in a reactor suitable for emulsion polymerization, equipped with agitation means, heating means and cooling means. With agitation, the reactor is purged with nitrogen (99% pure), and heated to about 75 77° C. The temperature of the reactor contents is adjusted to about 71–74° C., and about 74 g of the monomer mixture (20% of a total of 371 g of the MMA/BA/MMA monomer mixture in the ratio above) is added to the reactor. After 10 minutes, 15 g of a solution of ammonium persulfate (20% of the total solution of 1.9 g of ammonium persulfate dissolved in 74.0 g of water) is added to the reactor over a period of about 10 minutes with continued agitation, during which time there is an exotherm of about 5–8° C. After the exotherm is complete, about 299 g of the monomer mixture (the remaining 80% MMA/BA/

MMA monomer mixture), 60.7 g of the ammonium persulfate solution (the remaining 80%), and 15.3 g of the allyl amine salt of Cedephos CP-610 (as a 20% active aqueous solution) are simultaneously charged to the reactor over a period of 2 hours with continued agitation, while keeping the reactor contents at a temperature of about 78–81° C. The reactor temperature is then elevated to about 82–84° C. with continued agitation, for about 15 minutes. After this 15 minute period, the reactor is cooled to about 30° C. The resulting latex product is completely removed from the reactor and gravity filtered using a first 20 mesh screen and then a second 250 mesh screen. The total latex coagulum (i.e. solids) from both mesh screens is collected, combined and weighed. Various physiochemical properties of the latex are reported in Table II.

EXAMPLE 4

COMPARATIVE EXAMPLE

A methylmethacrylate/butylacrylate/methacrylic acid (MMA/BA/MMA) co-polymer (in a weight ratio of about 46:51:3), in combination with the propylamine salt of nonyl phenol 9-EO phosphate acid ester (Cedephos CP-610) is prepared as follows. About 251 g of deionized water and about 10.2 g of propylamine salt of Cedephos CP-610 (as a 20% active aqueous solution), are placed in a reactor suitable for emulsion polymerization, equipped with agitation means, heating means and cooling means. With agitation, the reactor is purged with nitrogen (99% pure), and heated to about 75 77° C. The temperature of the reactor contents is adjusted to about 71–74° C., and about 75 g of the monomer mixture (20% of a total of 375 g of the MMA/BA/MMA monomer mixture in the ratio above) is added to the reactor. After 10 minutes, 15 g of a solution of ammonium persulfate (20% of the total solution of 1.9 g of ammonium persulfate dissolved in 75.0 g of water) is added to the reactor over a period of about 10 minutes with continued agitation, during which time there is an exotherm of about 8–10° C. After the exotherm is complete, about 300 g of the monomer mixture (the remaining 80% MA(BA/MMA monomer mixture), 61.5 g of the ammonium persulfate solution (the remaining 80%), and 15.3 g of the propylamine salt of Cedephos CP-610 (as a 20% active aqueous solution) are simultaneously charged to the reactor over a period of 2 hours with continued agitation, while keeping the reactor contents at a temperature of about 78–80° C. The reactor temperature is then elevated to about 82–84° C. with continued agitation, for about 15 minutes. After this 15 minute period, the reactor is cooled to about 30° C. The resulting latex product is completely removed from the reactor and gravity filtered using a first 20 mesh screen and then a second 250 mesh screen. The total latex coagulum (i.e. solids) from both mesh screens is collected, combined and weighed. Various physiochemical properties of the latex are reported in Table II.

EXAMPLE 5

A methylmethacrylate/butylacrylate/methacrylic acid (MMA/BA/MMA) co-polymer (in a weight ratio of about (48:49:3), in combination with the allylamine salt of lauric acid (ALA) is prepared as follows. About 205 g of deionized water and about 1.6 g of ALA (as a 20% active aqueous solution), are placed in a reactor suitable for emulsion polymerization, equipped with agitation means, heating means and cooling means. With agitation, the reactor is purged with nitrogen (99% pure), and heated to about 70–73° C. The temperature of the reactor contents is adjusted to about 71–73° C., and about 75 g of the monomer mixture (20% of a total of 374 g of the MMA/BA/MMA monomer mixture in the ratio above) is added to the reactor. After 10 minutes, 15 g of a solution of ammonium persulfate (20% of the total solution of 1.8 g of ammonium persulfate dissolved in 75.0 g of water) is added to the reactor over a period of about 10 minutes with continued agitation, during which time there is an exotherm of about 2–3° C. After the exotherm is complete, about 299 g of the monomer mixture (the remaining 80% MMA/BA/MMA monomer mixture), 61.5 g of the ammonium persulfate solution (the remaining 80%), and 29.2 g of the ALA (as a 20% active aqueous solution) are simultaneously charged to the reactor over a period of 2 hours with continued agitation, while keeping the reactor contents at a temperature of about 78–81° C. The reactor temperature is then elevated to about 83–85° C. with continued agitation, for about 15 minutes. After this 15 minute period, the reactor is cooled to about 30° C. The resulting latex product is completely removed from the reactor and gravity filtered using a first 20 mesh screen and then a second 250 mesh screen. The total latex coagulum (i.e. solids) from both mesh screens is collected, combined and weighed. Various physiochemical properties of the latex are reported in Table II.

EXAMPLE 6

COMPARATIVE EXAMPLE

A methylmethacrylate/butylacrylate/methacrylic acid (MA/BA/MMA) co-polymer (in a weight ratio of about (48:49:3), in combination with the propylamine salt of lauric acid (PLA) is prepared as follows. About 206 g of deionized water and about 1.6 g of PLA (as a 20% active aqueous solution), are placed in a reactor suitable for emulsion polymerization, equipped with agitation means, heating means and cooling means. With agitation, the reactor is purged with nitrogen (99% pure), and heated to about 75–77° C. The temperature of the reactor contents is adjusted to about 71–73° C., and about 7 g of the monomer mixture (2% of a total of 373 g of the MMA/BA/MMA monomer mixture in the ratio above) is added to the reactor. After 10 minutes, 15 g of a solution of ammonium persulfate (20% of the total solution of 1.8 g of ammonium persulfate dissolved in 75.0 g of water) is added to the reactor over a period of about 10 minutes with continued agitation, during which time there is an exotherm of about 2–3° C. After the exotherm is complete, about 366 g of the monomer mixture (the remaining 98% MMA/BA/MMA monomer mixture), 61.5 g of the ammonium persulfate solution (the remaining 80%), and 28.4 g of the PLA (as a 20% active aqueous solution) are simultaneously charged to the reactor over a period of 2 hours with continued agitation, while keeping the reactor contents at a temperature of about 79–82° C. The reactor temperature is then elevated to about 83–85° C. with continued agitation, for about 15 minutes. After this 15 minute period, the reactor is cooled to about 30° C. The resulting latex product is completely removed from the reactor and gravity filtered using a first 20 mesh screen and then a second 250 mesh screen. The total latex coagulum (i.e. solids) from both mesh screens is collected, combined and weighed. Various physiochemical properties of the latex are reported in Table II.

TABLE II

Latexes of Methylmethacrylate/Butylacrylate/Methacrylic Acid

| Surfactant | Coagulum (%) | Viscosity (CPS) | Mechanical Stability (min) | Particle Size (microns) | Contact Angle (deg.) | pH | Solids (%) | Method of Initiation |
|---|---|---|---|---|---|---|---|---|
| Polymerizable Surfactant ADDBS (Ex. 1) | <0.2 | 11 | 8 | 120.5 | 125 | 2.43 | 46.9 | Thermal |
| Non-Polymerizable Surfactant PDDBS (Comparative Ex. 2) | <0.03 | 220 | 5 | 122.5 | 98 | 2.23 | 44 | Thermal |
| Polymerizable Surfactant Allylamine-Cedephos (Ex. 3) | <0.67 | 90 | ND | 135 | 126 | 3.25 | 46.6 | Thermal |
| Non-Polymerizable Surfactant PDDBS (Comparative Ex. 4) | <0.52 | 115 | ND | 149 | 104 | 2.92 | 47.7 | Thermal |
| Polymerizable Surfactant ALA (Ex. 5) | <0.67 | 50 | >15 | 1191 | ND | 5.7 | 49.7 | Thermal |
| Non-Polymerizable Surfactant PLA (Comparative Ex. 6) | <0.52 | 50 | >15 | 1197.7 | ND | 6.1 | 48.8 | Thermal |

EXAMPLE 7

A vinylacetate/butyl acrylate (VA/BA) co-polymer (in a weight ratio of about 78.9:21.1), in combination with the allylamine salt of dodecylbenzenesulfonic acid (ADDBS) and propylamine salt of dodecylbenzenesulfonic (PDDBS) is prepared as follows. About 245 g of deionized water and about 1.5 g of ADDBS (as a 20% active aqueous solution), 1.5 g of PDDBS (as a 23% active aqueous solution), and 1.0 g of sodium sulfate are placed in a reactor suitable for emulsion polymerization, equipped with agitation means, heating means and cooling means. With agitation, the reactor is purged with nitrogen (99% pure), and heated to about 65–68° C. The temperature of the reactor contents is adjusted to about 63–65° C., and about 73.7 g of the monomer mixture (20% of a total of 369 g of the VA/BA monomer mixture in the ratio above) is added to the reactor. After 10 minutes, 15 g of a solution of ammonium persulfate (20% of the total solution of 1.8 g of ammonium persulfate dissolved in 75.0 g of water) is added to the reactor over a period of about 5 minutes with continued agitation. The temperature of the reactor is increased to about 82–84° C. Evidence of polymerization is observed by the appearance of blue tint in the reaction contents and a slight exotherm of 1–2° C. The temperature of the reaction contents is adjusted to about 76–78° C. and about 294 g of the BA/VA monomer mixture (the remaining 80%), 61.5 g of the ammonium persulfate solution (the remaining 80%), 27.46 g ADDBS (as a 20% active aqueous solution), and 8.59 g PDDBS (as a 23% active aqueous solution) are simultaneously charged to the reactor over a period of 4 hours with continued agitation, while keeping the reactor contents at a temperature of about 78–82° C. The reactor temperature is then elevated to about 82–84° C. with continued agitation, for about 15 minutes. After this 15 minute period, the reactor is cooled to about 30° C. The resulting latex product is completely removed from the reactor and gravity filtered using a first 20 mesh screen and then a second 250 mesh screen. The total latex coagulum (i.e. solids) from both mesh screens is collected, combined and weighed. Various physiochemical properties of the latex are reported in Table III.

EXAMPLE 8

COMPARATIVE EXAMPLE

A vinylacetate/butyl acrylate (VA/BA) co-polymer (in a weight ratio of about 79.1:20.9), in combination with the propyl amine salt of dodecylbenzenesulfonic acid (PDDBS) is prepared as follows. About 162 g of deionized water and about 5.4 g of PDDBS (as a 23% active aqueous solution) are placed in a reactor suitable for emulsion polymerization, equipped with agitation means, heating means and cooling means. With agitation, the reactor is purged with nitrogen (99% pure), and heated to about 65–68° C. The temperature of the reactor contents is adjusted to about 62° C., and about 5.0 g of the monomer mixture (2% of a total of 245 g of the VA/BA monomer mixture in the ratio above) is added to the reactor. After 10 minutes, 10.1 g of a solution of ammonium persulfate (20% of the total solution of 1.8 g of ammonium persulfate dissolved in 75.0 g of water) is added to the reactor over a period of about 15 minutes with continued agitation. The temperature of the reactor is increased to about 82–84° C. Evidence of polymerization is observed by the appearance of blue tint in the reaction contents and a slight exotherm of 2–4° C. The temperature of the reaction contents is adjusted to about 76–78° C. and about 240 g of the BA/VA monomer mixture (the remaining 80%), 40.7 g of the ammonium persulfate solution (the remaining 80%), 16.8 g PDDBS (as a 23% active aqueous solution) are simultaneously charged to the reactor over a period of 4 hours with continued agitation, while keeping the reactor contents at a temperature of about 78–80° C. The reactor temperature is then elevated to about 82–84° C. with continued agitation, for about 15 minutes. After this 15 minute period, the reactor is cooled to about 30° C. The resulting latex product is completely removed from the reactor and gravity filtered using a first 20 mesh screen and then a second 250 mesh screen. The total latex coagulum (i.e. solids) from both mesh screens is collected, combined and weighed. Various physiochemical properties of the latex are reported in Table III.

EXAMPLE 9

A vinylacetate/butyl acrylate (VA/BA) co-polymer (in a weight ratio of about 78.9:21.1), in combination with the allylamine salt of dodecylbenzenesulfonic acid (ADDBS) and the ammonium salt of lauryl ether sulphate with 30 EO groups (ALSE) is prepared as follows. About 245 g of deionized water and about 1.5 g of ADDBS (as a 19% active aqueous solution) and 1.0 g of sodium sulfate are placed in a reactor suitable for emulsion polymerization, equipped with agitation means, heating means and cooling means. With agitation, the reactor is purged with nitrogen (99% pure), and heated to about 65–68° C. The temperature of the reactor contents is adjusted to about 60–63° C., and about 73.7 g of the monomer mixture (20% of a total of 369 g of the VA/BA monomer mixture in the ratio above) is added to the reactor. After 10 minutes, 15 g of a solution of ammonium persulfate (20% of the total solution of 1.8 g of ammonium persulfate dissolved in 75.0 g of water) is added to the reactor over a period of about 5 minutes with continued agitation. The temperature of the reactor is increased to about 82–84° C. Evidence of polymerization is observed by the appearance of blue tint in the reaction contents and a slight exotherm of 1–2° C. The temperature of the reaction contents is adjusted to about 78–81° C. and about 294 g of the BA/VA monomer mixture (the remaining 80%), 61.4 g of the ammonium persulfate solution (the remaining 80%), 27.8 g ADDBS (as a 20% active aqueous solution), and 6.3 g ALSE (as a 30% active aqueous solution) are simultaneously charged to the reactor over a period of 4 hours with continued agitation, while keeping the reactor contents at a temperature of about 78–82° C. The reactor temperature is then elevated to about 82–84° C. with continued agitation, for about 15 minutes. After this 15 minute period, the reactor is cooled to about 30° C. The resulting latex product is completely removed from the reactor and gravity filtered using a first 20 mesh screen and then a second 250 mesh screen. The total latex coagulum (i.e. solids) from both mesh screens is collected, combined and weighed. Various physiochemical properties of the latex are reported in Table III.

EXAMPLE 10

A vinylacetate/butyl acrylate (VA/BA) co-polymer (in a weight ratio of about 78.9:21.1), in combination with the allylamine salt of dodecylbenzenesulfonic acid (ADDBS) and propylamine salt of dodecylbenzenesulfonic (PDDBS) is prepared, using redox couple as initiators, as follows. About 251 g of deionized water and about 1.5 g of ADDBS (as a 19% active aqueous solution), 0.9 g of PDDBS (as a 23% active aqueous solution), and 0.3 g of sodium hydrogen carbonate are placed in a reactor suitable for emulsion polymerization, equipped with agitation means, heating means and cooling means. With agitation, the reactor is purged with nitrogen (99% pure), and heated to about 65–68° C. The temperature of the reactor contents is adjusted to about 63–65° C., and about 10.3 g of the monomer mixture (2% of a total of 513 g of the VA/BA monomer mixture in the ratio above) is added to the reactor. After 15 minutes, 13.7 g of a solution of ammonium persulfate (20% of the total solution of 2.0 g of ammonium persulfate dissolved in 66.5 g of water) and 13.7 g of a solution of sodium metabisulfite (20% of the total solution of 0.83 g of sodium metabisulfite dissolved in 67.8 g of water) is added to the reactor over a period of about 5 minutes with continued agitation. Evidence of polymerization is observed by the appearance of blue tint in the reaction contents and a slight exotherm of 1–2° C. The temperature of the reaction contents is adjusted to about 68–72° C., and 54.9 g of the sodium metabisulphite solution (the remaining 80%), 54.8 g of the ammonium persulfate solution (the remaining 80%), 503 g of the BA/VA monomer mixture (the remaining 98%), 29.3 g of ADDBS (as a 19% active aqueous solution), and 10.3 g of PDDBS (as a 23% active aqueous solution) are simultaneously added over a period of three hours with continued agitation, while keeping the reactor contents at a temperature of about 68–72° C. The reactor temperature is then elevated to about 75–78° C. with continued agitation, for about 15 minutes. After this 15 minute period, the reactor is cooled to about 30° C. The resulting latex product is completely removed from the reactor and gravity filtered using a first 20 mesh screen and then a second 250 mesh screen. The total latex coagulum (i.e. solids) from both mesh screens is collected, combined and weighed. Various physiochemical properties of the latex are reported in Table III.

TABLE III

Latexes of Vinylacetate/Butylacrylate

| Surfactant | Coagulum (%) | Viscosity (CPS) | Mechanical Stability (min) | Particle Size (microns) | Contact Angle (deg.) | pH | Solids (%) | Method of Initiation |
|---|---|---|---|---|---|---|---|---|
| Polymerizable/Non-Polymerizable Surfactants ADDBS & PDDBS (Ex. 7) | <0.09 | 220 | >13 | 266/767 | 86 | 2.23 | 45.1 | Thermal |
| Non-Polymerizable Surfactant PDDBS (Comparative Ex. 8) | <0.05 | 50 | 6 | 98.3 | 104 | 2.48 | 41.2 | Thermal |
| Polymerizable/Non-Polymerizable Surfactants ADDBS & ALSE (Ex. 9) | <0.03 | 50 | ND | 1599 | ND | 2.63 | 45.3 | Thermal |
| Polymerizable/Non-Polymerizable Surfactants ADDBS & PDDBS (Ex. 10) | <0.06 | 220 | ND | 410 | ND | 5.23 | 46.6 | Redox |

The hydrophobicity of a latex prepared using a typical non-polymerizable surfactant was compared to that of a latex prepared using a representative polymerizable surfactant of the present invention. It has been discovered that the latex prepared in Example 1 (using ADDBS) possess remarkable hydrophobicity, as compared to the latex prepared according to Example 1 (using the ammonium salt of dodecylbenzene sulfonic acid, AmDDBS). [Need to insert ASTM method and description here.] The change in contact angle as a function of time for a water droplet at each of the latex film surfaces was measured; the results are shown below.

| Latex Surfactant | | Time (Seconds) | | | |
|---|---|---|---|---|---|
| | | 5 | 20 | 40 | 60 |
| AmDDBS (non-polymerizable) | (Contact Angle) | 98° | 74° | 51° | 27° |
| ADDBS (polymerizable) | (Contact Angle) | 125° | 125° | 125° | 125° |

Without being bound by any particular theory, a rapidly increasing contact angle as observed from a latex film indicates that the water droplet is penetrating the film due to surfactant related imperfections of the film. A constant water droplet contact angle, as in the case of the ADDBS derived latex, indicates the desirable result whereby water is unable to penetrate the hydrophobic film.

In a test similar to the contact angle measurements, the hydrophobicity of a latex prepared using a typical non-polymerizable surfactant was compared to that of a latex prepared using a representative polymerizable surfactant of the present invention, whereby the different latex films were coated and heat cured onto porous filter paper and treated with water. As observed in the results shown below, water undesirably, readily penetrated through the film and absorbed into the paper in a few seconds for the latex derived from the AmDDBS surfactant. However, the latex film derived from the ADDBS surfactant, did not allow the water to penetrate or absorb; the water droplet maintained its original shape on the latex film, prior to being influenced by evaporation effects (at least thirty minutes).

| Latex Surfactant | | Time (Seconds) | | | |
|---|---|---|---|---|---|
| | | 5 | 20 | 40 | 60 |
| AmDDBS (non-polymerizable) | (penetration/ absorption) | slight | total | total | total |
| ADDBS (polymerizable) | (penetration/ absorption) | none | none | none | none |

The adhesion properties of a latex prepared using a typical non-polymerizable surfactant were compared to that of a latex prepared using a representative polymerizable surfactant of the present invention. It has been discovered that the latex prepared in Example 1 (using ADDBS) possess a vastly superior adhesion profile, as compared to the latex prepared according to Example 1 (using the ammonium salt of dodecylbenzene sulfonic acid, AmDDBS). Adhesion data were collect for each latex acrylic lattice using ASTM method D897. This test method is a standard test for adhesion called "block pull"; results from the test are indicated in pounds per square inch (p.s.i.), wherein the higher the p.s.i. obtained, the better the adhesion properties of the latex. Adhesive failure is defined as the point at which the latex, upon application of a pulling force, no longer adheres to the surface of the substrate. Cohesive failure is defined as the point at which the latex itself fails, i.e. where the latex splits into two or more portions, but remains bound to the substrate. The adhesion tests were conducted using an Instron Model 1123, with a 5000 pound load cell, a sample size of 0.5 g of latex, a surface area of 4 in$^2$, whereby the treated sample blocks were allowed to dry at room temperature (i.e. 25° C.) for three days under 0.25 p.s.i. external pressure. Aluminum and steel blocks were prepared by sanding with extra fine 220 grit paper until smooth to the touch. A weighed amount of each latex (0.5 g) was placed on one surface of one block and another block place on top for three days. Failure was determined by visual inspection, with the results indicated below.

| Latex Surfactant | Adhesive Failure (p.s.i.) |
|---|---|
| AmDDBS (non-polymerizable) | 65 |
| ADDBS (polymerizable) | 170 |

The latex film yellowing properties of a latex prepared using a typical non-polymerizable surfactant were compared to that of a latex prepared using a representative polymerizable surfactant of the present invention. It has been discovered that the latex prepared in Example 1 (using ADDBS) possess a greatly improved film yellowing profile, as compared to the latex prepared according to Example 1 (using the ammonium salt of dodecylbenzene sulfonic acid, AmDDBS). Latex film yellowing was compared after aging the films six months at room temperature, at approximately standard atmospheric conditions. It is highly desirable, as known by one skilled in the art, to produce a latex film which does not yellow upon application to a surface, with the passage of time. After a period of 6 months, the ADDBS-derived latex was plainly observed to be significantly lighter color than the AmDDBS-derived latex. Absorbence measurements were taken for each latex at 350 nm and 420 nm; the lower the absorbance at a given wave length, the lighter the latex (i.e. the less yellow the latex). Results of the measurements for the two latexes are shown below.

| Latex Surfactant | Latex Absorbance | |
|---|---|---|
| | 350 nm | 420 nm |
| AmDDBS (non-polymerizable) | 16.9 | 5.3 |
| ADDBS (polymerizable) | 10.0 | 2.5 |

The scrubability properties of a latex prepared using a typical non-polymerizable surfactant were compared to that of a latex prepared using a representative polymerizable surfactant of the present invention. It has been discovered that the latex prepared in Example 1 (using ADDBS) possess improved scrubability characteristics, as compared to the latex prepared according to Example 1 (using the ammonium salt of dodecylbenzene sulfonic acid, AmDDBS). Scrubability of the latexes-was evaluated using ASTM scrub test D2486. Seven Star Acrylic Flat House Paint, 103A100 White, from Ace Hardware was utilized in the testing. The ADBBS- and AmDDBS-derived latexes were individually added to the paint in a ratio of 2:1 (latex:paint).

FTIR comparisons were conducting by casting latex films on glass, derived from both ADDBS and AmDDBS. The films were dried at room temperature for several days, removed from the glass and aged at room temperature, at approximately standard atmospheric conditions, for six months. The films were individually placed on a ZnSe plates and the FTIR spectra recorded. Peak heights were measured on the absorbance peak located at 1035 cm$^{-1}$ (i.e. the S=O stretch peak) for each film. It has been discovered that the latex prepared in Example 1 (using ADDBS) possess a much lower peak height absorbance in the FTIR spectrum, as compared to the latex prepared according to Example 1 (using the ammonium salt of dodecylbenzene sulfonic acid, AmDDBS). Without being bound by any particular theory, a lower the peak height absorbance indicates a desirable characteristic of the latex, whereby the individual surfactant molecules are not present at the surface of the latex film, i.e. they have not migrated to the surface of the film.

| Latex Surfactant | Latex FTIR Absorbance (×10$^{-4}$) |
|---|---|
| AmDDBS (non-polymerizable) | 73 |
| ADDBS (polymerizable) | 29 |

From the foregoing, it will be appreciated that although specific embodiments of the invention have been described herein for purposes of illustration, various modifications may be made without deviating from the spirit or scope of the invention.

What is claimed:

1. A homopolymeric surface active agent formed by polymerizing a polymerizable, surface active agent, wherein the polymerizable, surface active agent is a salt comprising:
   a) at least one acid, wherein the acid is an alkyl aryl sulfonic acid; and
   b) at least one nitrogenous base, wherein the nitrogenous base contains at least one nitrogen atom and at least one ethylenically unsaturated moiety.

2. A homopolymeric surface active agent as in claim 1, wherein the alkyl ether sulfonic acid has an alkyl chain comprising saturated or unsaturated hydrocarbon groups having from about 1 to about 24 carbon atoms.

3. A homopolymeric surface active agent as in claim 1, wherein the ether unit has the following structure:

$$(CH_2CH(R')O)_n$$

where n=1–100 and R' is methyl or hydrogen.

* * * * *